US009743397B2

United States Patent
Cavalcante et al.

(10) Patent No.: US 9,743,397 B2
(45) Date of Patent: Aug. 22, 2017

(54) REDUCED-SIZE MESSAGE PASS IN FACTOR GRAPHS FOR WIRELESS COMMUNICATIONS NETWORKS

(71) Applicant: Telefonaktiebolaget L M Ericsson (publ), Stockholm (SE)

(72) Inventors: Charles Casimiro Cavalcante, Bairro Meireles (BR); Igor Moáco Guerreiro, Fortaleza (BR); Dennis Hui, Sunnyvale, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 233 days.

(21) Appl. No.: 14/080,122

(22) Filed: Nov. 14, 2013

(65) Prior Publication Data

US 2015/0131524 A1   May 14, 2015

(51) Int. Cl.
*H04W 72/04* (2009.01)
*H04W 16/02* (2009.01)
*H04W 24/02* (2009.01)
*H04W 28/06* (2009.01)

(52) U.S. Cl.
CPC ....... *H04W 72/0426* (2013.01); *H04W 16/02* (2013.01); *H04W 24/02* (2013.01); *H04W 28/06* (2013.01)

(58) Field of Classification Search
USPC ...................................................... 370/328
See application file for complete search history.

(56) References Cited

U.S. PATENT DOCUMENTS

| 2005/0078737 A1 | 4/2005 | Craig et al. |
| 2007/0168832 A1 | 7/2007 | Richardson et al. |
| 2007/0174633 A1 | 7/2007 | Draper et al. |

(Continued)

OTHER PUBLICATIONS

Delle Fave, F.M., et al., "Deploying the Max-Sum Algorithm for Decentralised Coordination and Task Allocation of Unmanned Aerial Vehicles for Live Aerial Imagery Collection," 2012 IEEE International Conference on Robotics and Automation, May 14-18, 2012, Saint Paul, Minnesota, pp. 469-476.

(Continued)

*Primary Examiner* — Omar Ghowrwal
*Assistant Examiner* — Angel Brockman
(74) *Attorney, Agent, or Firm* — Withrow & Terranova, PLLC

(57) ABSTRACT

Systems and methods are disclosed for graph-based distributed parameter coordination in a communications network. In general, discrete local parameters to be coordinated among communication nodes in the communications network and their respective performance metrics, or costs, are modeled using a factor graph. Based on the factor graph, a variant of a sum-product algorithm, namely the min-sum algorithm, is applied in order for the communication nodes, through iterative message passing of reduced size messages with their neighboring communication nodes, to decide upon optimal values for the local parameters for the communication nodes that collectively optimize a global performance metric across the communications network. In one embodiment, the communications network is a wireless communications network. In one specific embodiment, the wireless communications network is a cellular communications network.

33 Claims, 10 Drawing Sheets

(56) References Cited

U.S. PATENT DOCUMENTS

| | | |
|---|---|---|
| 2008/0019374 A1* | 1/2008 | Lee et al. ............... 370/395.4 |
| 2008/0212549 A1 | 9/2008 | Park et al. |
| 2008/0294960 A1 | 11/2008 | Sharon et al. |
| 2011/0069648 A1* | 3/2011 | Lee .................. H04L 1/0003 370/310 |
| 2011/0080961 A1 | 4/2011 | Hui et al. |
| 2011/0189950 A1 | 8/2011 | Noh et al. |
| 2011/0231731 A1 | 9/2011 | Gross et al. |
| 2013/0021923 A1 | 1/2013 | Morgan et al. |
| 2013/0072131 A1 | 3/2013 | Guey et al. |
| 2013/0142078 A1 | 6/2013 | Hui et al. |
| 2013/0142082 A1 | 6/2013 | Cavalcante et al. |

OTHER PUBLICATIONS

Loeliger, H., "An Introduction to Factor Graphs," IEEE Signal Processing Magazine, vol. 21, No. 1, Jan. 1, 2004, pp. 28-41.

International Search Report and Written Opinion for PCT/IB2014/065997, mailed Feb. 17, 2015, 13 pages.

Author Unknown, "Game Theory," Appendix A, Second Technical Report: A Distributed Approach for Antenna Selection in Multicell MIMO Systems, UFC.31 TR02-1, Jun. 2011, GTEL, 5 pages.

Guerreiro, Igor et al., "A distributed approach to precoder selection using factor graphs for wireless communication networks," EURASIP Journal on Advances in Signal Processing, vol. 2013, No. 83, Springer, Apr. 19, 2013, 18 pages.

Guerrieiro et al., "A Graph-Based Approach for Distributed Parameter Coordination in Wireless Communication Networks", IEEE Globecome 2012 Workshop, Dec. 3, 2012, pp. 152-156, Anaheim, California.

Ng, B. et al., "Distributed Downlink Beamforming with Cooperative Base Stations", IEEE Transactions Information Theory, vol. 54, Issue 12, Dec. 2008, pp. 5491-5499.

Ni, J. et al., "Performance Evaluation of Loss Networks via Factor Graphs and the Sum-Product Algorithm", 26th IEEE International Conference on Computer Communications (INFOCOM 2007), May 1, 2007, pp. 409-417.

Kschischang, F. et al., "Factor graphs and the sum-product algorithm", IEEE Transactions on Information Theory, vol. 47, No. 2, Feb. 2001, pp. 498-519.

Sohn, I. et al., "A Graphical Model Approach to Downlink Cooperative MIMO Systems", Global Telecommunications Conference 2010, Dec. 2010, pp. 1-5.

Zhang et al., "Linear Coordinate-Descent Message-Passing for Quadratic Optimization", 2012 IEEE International Conference on Acoustics, Speech and Signal Processing (ICASSP 2012), Mar. 25-30, 2012, pp. 2005-2008, Kyoto, Japan.

International Search Report for PCT/B2012/056810, mailed Mar. 22, 2013, 13 pages.

Non-Final Office Action for U.S. Appl. No. 13/308,776, mailed Sep. 13, 2013, 21 pages.

Final Office Action for U.S. Appl. No. 13/308,776, mailed Apr. 8, 2014, 23 pages.

Notice of Allowance for U.S. Appl. No. 13/308,776, mailed Jun. 30, 2014, 8 pages.

Notice of Allowance for U.S. Appl. No. 13/688,561, mailed Nov. 28, 2014, 9 pages.

International Preliminary Report on Patentability for PCT/IB2012/056810, mailed Jun. 12, 2014, 9 pages.

* cited by examiner

REDUCED-SIZE MESSAGE PASS IN FACTOR GRAPHS FOR WIRELESS COMMUNICATIONS NETWORKS

FIELD OF THE DISCLOSURE

The present disclosure relates to a communications network and more particularly relates to distributed parameter coordination in a communications network.

BACKGROUND

In a communications network, such as a cellular communications network, local parameter settings of one communication node oftentimes influence the selection of local parameters of neighboring communication nodes in the communications network. For instance, it is sometimes necessary for each base station in a cellular communications network to select a set of parameters that is uniquely distinguishable from those selected by its neighboring base stations (i.e., base stations that serve neighboring cells in the cellular communications network). Take downlink transmission for example. Each base station needs to transmit a locally unique Reference Signal (RS) for User Equipments (UEs) to identify the base station and to synchronize to the downlink transmission from the base station. The set of available reference signals is limited, and each base station needs to select (or be assigned) a reference signal that is different from the reference signals of its neighboring base stations. As another example, each base station may select (or be assigned) one of several frequency bands for transmission. If the same frequency band is only reused by other base stations serving cells that are far away, inter-cell interference can be significantly reduced. This is the classical frequency planning commonly practiced in second generation networks such as Global System for Mobile Communications (GSM) networks. There are also occasions when each base station may need to set a value to a parameter, such as transmit power, in such a way that the setting is compatible with those of the neighboring base stations in order to achieve a certain notion of optimality of the entire cellular communications network. These are just some typical problems encountered in the design of a cellular communications network in which a local parameter setting influences and is influenced by the settings of the neighboring cells.

Some of these problems, such as RS and frequency reuse, are typically static in nature and can therefore be solved by advanced planning during the build out of the cellular communications network. Currently, the parameters are set by planning tools that have access to information such as base station locations and radio propagation characteristics. Once a solution that is optimal network-wise is found, it remains unchanged for a long time until the deployment changes. However, other problems, such as transmit power control or precoder/beam selection, are more dynamic in nature and require more frequent updates as the channel conditions vary.

Further, in order to facilitate flexible, dense deployment of small base stations in future cellular communications networks, there is an increased interest in methods of coordinating parameters among neighboring cells in an autonomous and distributed fashion without a central controller, as any unplanned addition (or removal) of base stations can substantially alter the system topology and thus the preferred settings for the parameters. If a central controller is available, this entity may gather the needed information of all the communication nodes in the communications network through a backhaul to perform a joint optimization. On the other hand, without the need of such a central controller, the set of parameters can be coordinated in a distributed and selfish manner, that is, each communication node can make a decision to optimize its local performance. Lying between these two techniques, factor graphs may reach a solution close to the globally optimal but in a distributed manner through the use of message-passing algorithms.

Some applications of factor graphs for coordination of discrete parameters in a wireless communications network have been recently proposed, e.g. for the problem of fast beam coordination among base stations in Illsoo Sohn et al., "A Graphical Model Approach to Downlink Cooperative MIMO Systems," 2010 IEEE Global Telecommunications Conference (GLOBECOM 2010), pp. 1-5, Dec. 6-10, 2010 (hereinafter "Sohn") and Boon Loong Ng et al., "Distributed Downlink Beamforming With Cooperative Base Stations," IEEE Transactions on Information Theory, Vol. 54, No. 12, pp. 5491-5499, December 2008 (hereinafter "Ng"). The basic idea in those works is to model the relationship between the local parameters to be coordinated among different communication nodes of a network and their respective performance metrics or costs using a factor graph. In Sohn, the belief propagation algorithm is adopted to solve the downlink transmit beamforming problem in a multi-cell Multiple-Input-Multiple-Output (MIMO) system considering a one-dimensional cellular communications network model. Since the approach in Sohn considers a one-dimensional cellular communications network, it does not consider all interfering cells. In Ng, some message-passing algorithms (including the sum-product algorithm) are deployed to coordinate parameters of downlink beamforming in a distributed manner in a multi-cell Single-Input-Single-Output (SISO) system. However, the approach in Ng cannot support base stations and mobile devices with multiple antennas. Further, both of the approaches proposed in Sohn and Ng do not account for the fact that the adopted message-passing algorithms do not always converge.

U.S. Patent Application Publication No. 2013/0142078 filed on Dec. 1, 2011 and published on Jun. 6, 2013 and U.S. Patent Application Publication No. 2013/0142082 filed on Nov. 29, 2012 and published on Jun. 6, 2013 describe systems and methods for distributed parameter coordination that, among other things, overcome the problems with the approaches described above. A particular application of one embodiment of the factor-based approach described in U.S. Patent Application Publication No. 2013/0142078 and U.S. Patent Application Publication No. 2013/0142082 for precoder selection in a multi-cell scenario is described in Igor M. Guerreiro et al., "A distributed approach to precoder selection using factor graphs for wireless communication networks," EURASIP Journal on Advances in Signal Processing, Vol. 2013, No. 83, April 2013 (hereinafter "Guerreiro").

SUMMARY

Systems and methods are disclosed for graph-based distributed parameter coordination in a communications network. In general, discrete local parameters to be coordinated among communication nodes in the communications network and their respective performance metrics, or costs, are modeled using a factor graph. Based on the factor graph, a variant of the sum-product algorithm, namely the min-sum algorithm, is applied in order for the communication nodes, through iterative message passing with their neighboring communication nodes, to decide upon optimal values for the local parameters for the communication nodes that collectively optimize a global performance metric across the communications network. The messages passed between the communication nodes and their neighboring communication nodes are reduced size messages such that the amount of information that is exchanged between the communication nodes and their neighboring communication nodes is substantially reduced. In one embodiment, the communications network is a wireless communications network. In one specific embodiment, the wireless communications network is a cellular communications network.

In one embodiment, a communication node in a communications network iteratively exchanges reduced size messages with neighboring communication nodes of the communication node in the communications network based on a factor graph until a predefined stopping criteria is satisfied. The factor graph models discrete local parameters to be coordinated among communication nodes in the communications network and corresponding performance metrics of the communication nodes. In one embodiment, the reduced size messages are exchanged according to a min-sum algorithm. The communication node computes an optimal value for the local parameter of the communication node based on results of iteratively exchanging the reduced size messages with the neighboring communication nodes. The optimal value for the local parameter of the communication node and corresponding optimal values determined for local parameters of other communication nodes in the communications network together optimize a global performance metric for the communications network.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 3:
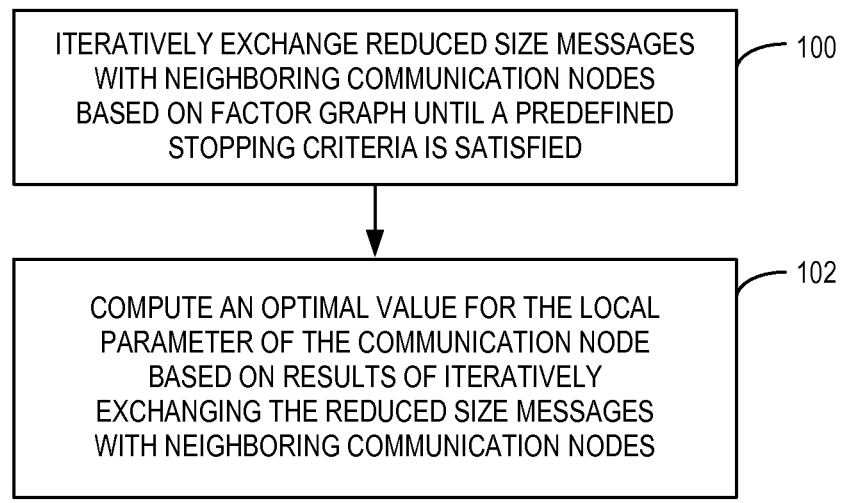
Figure 4A:
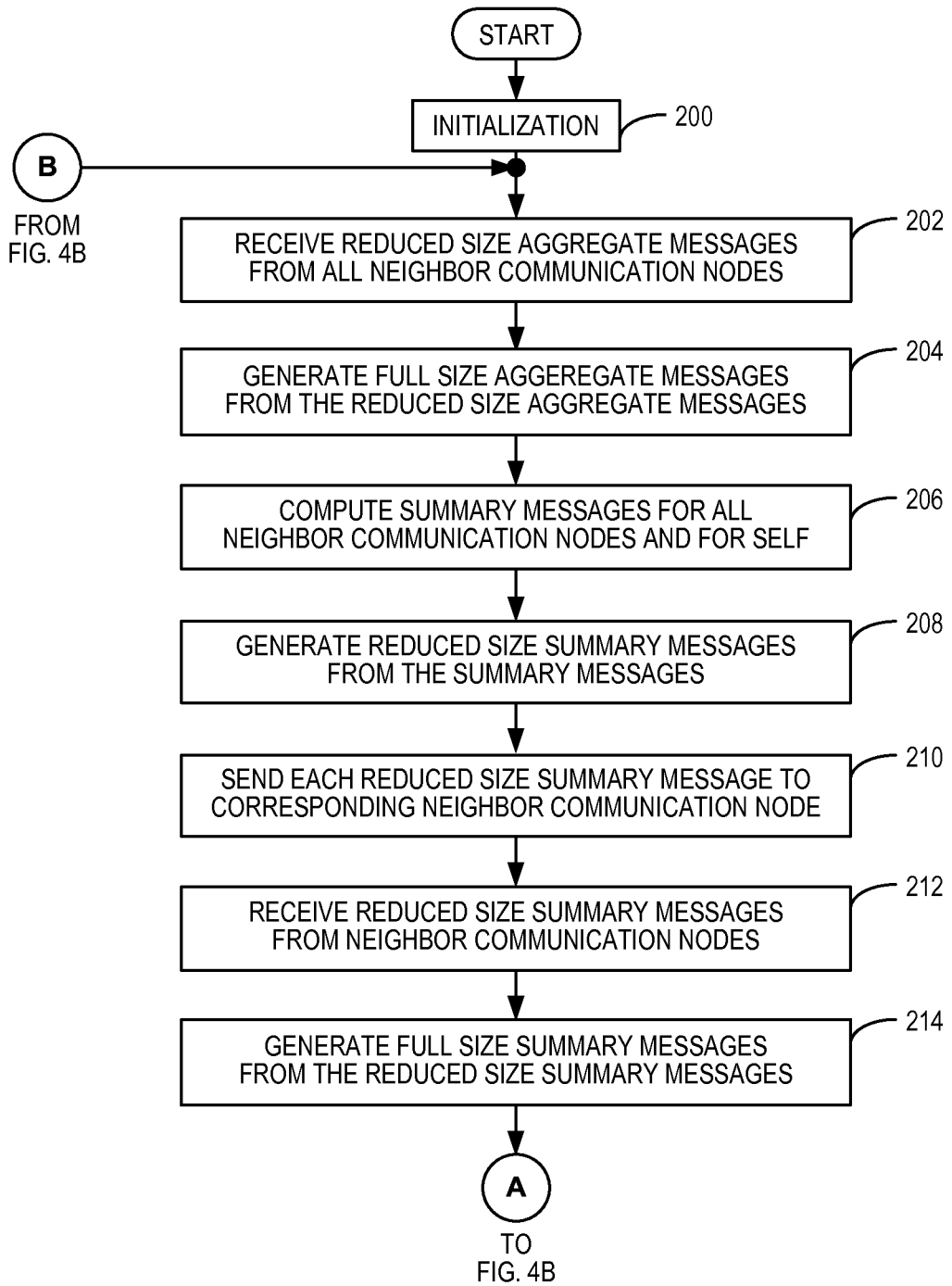
Figure 4B:
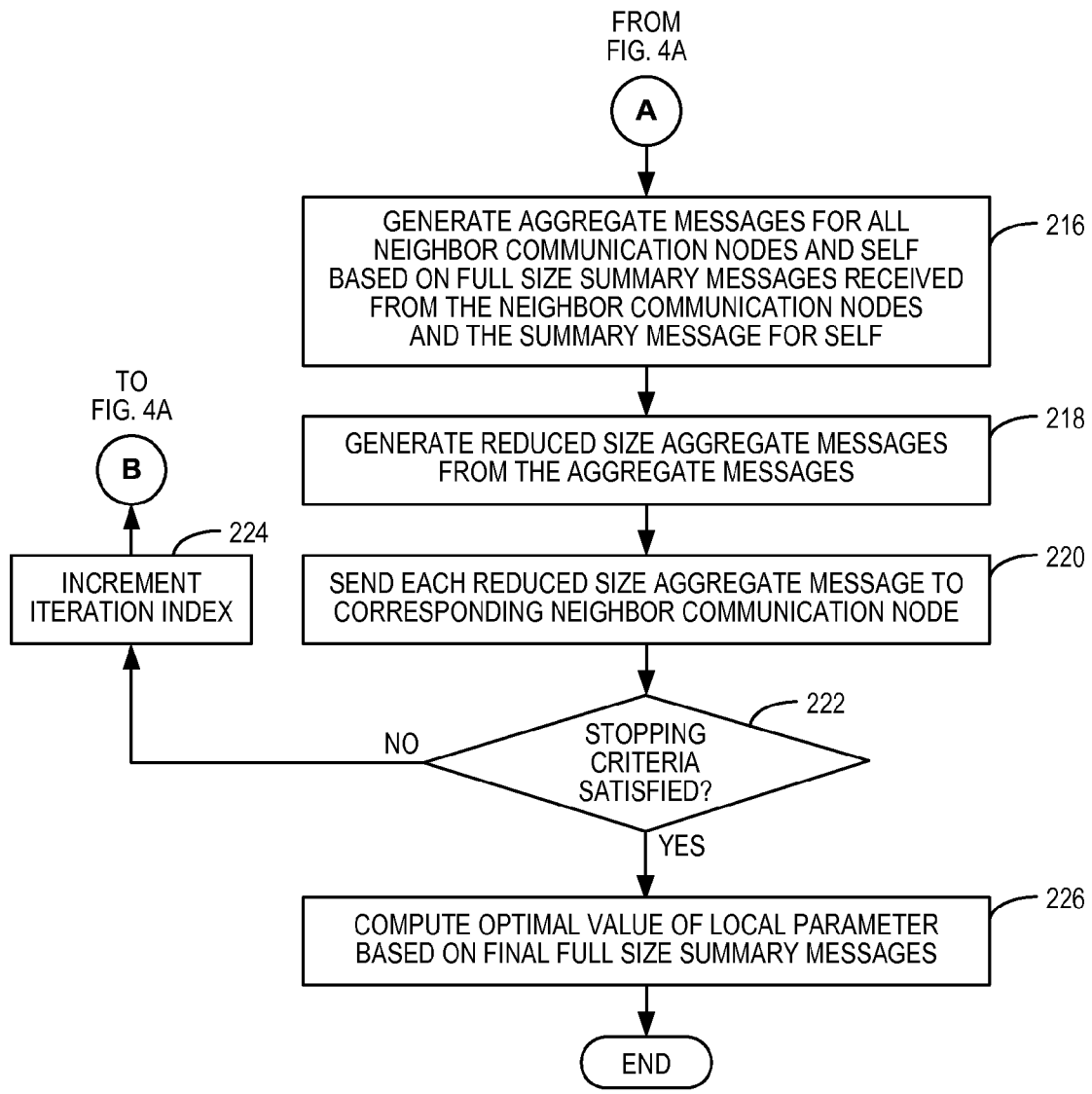
Figure 5A:
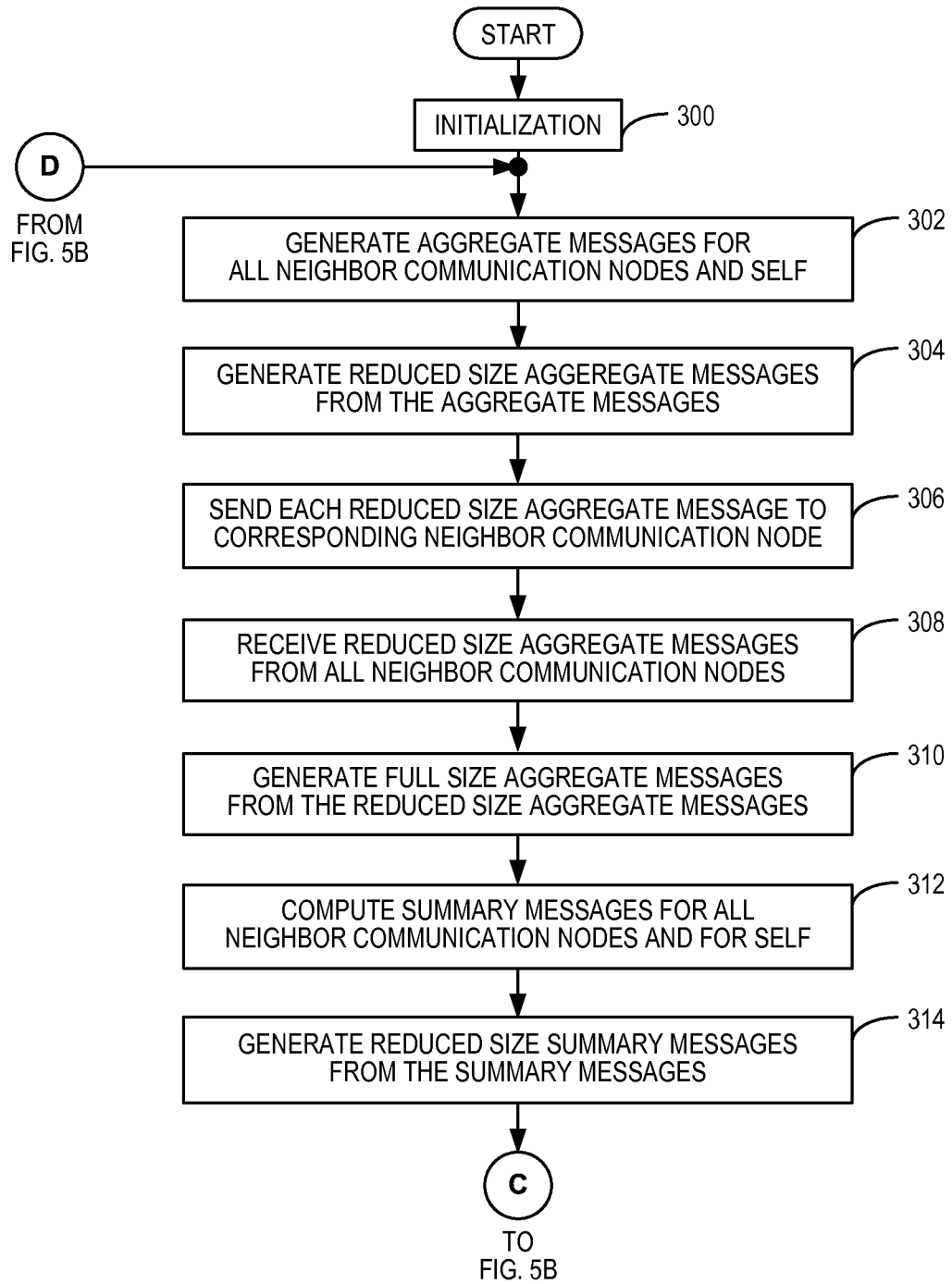
Figure 5B:
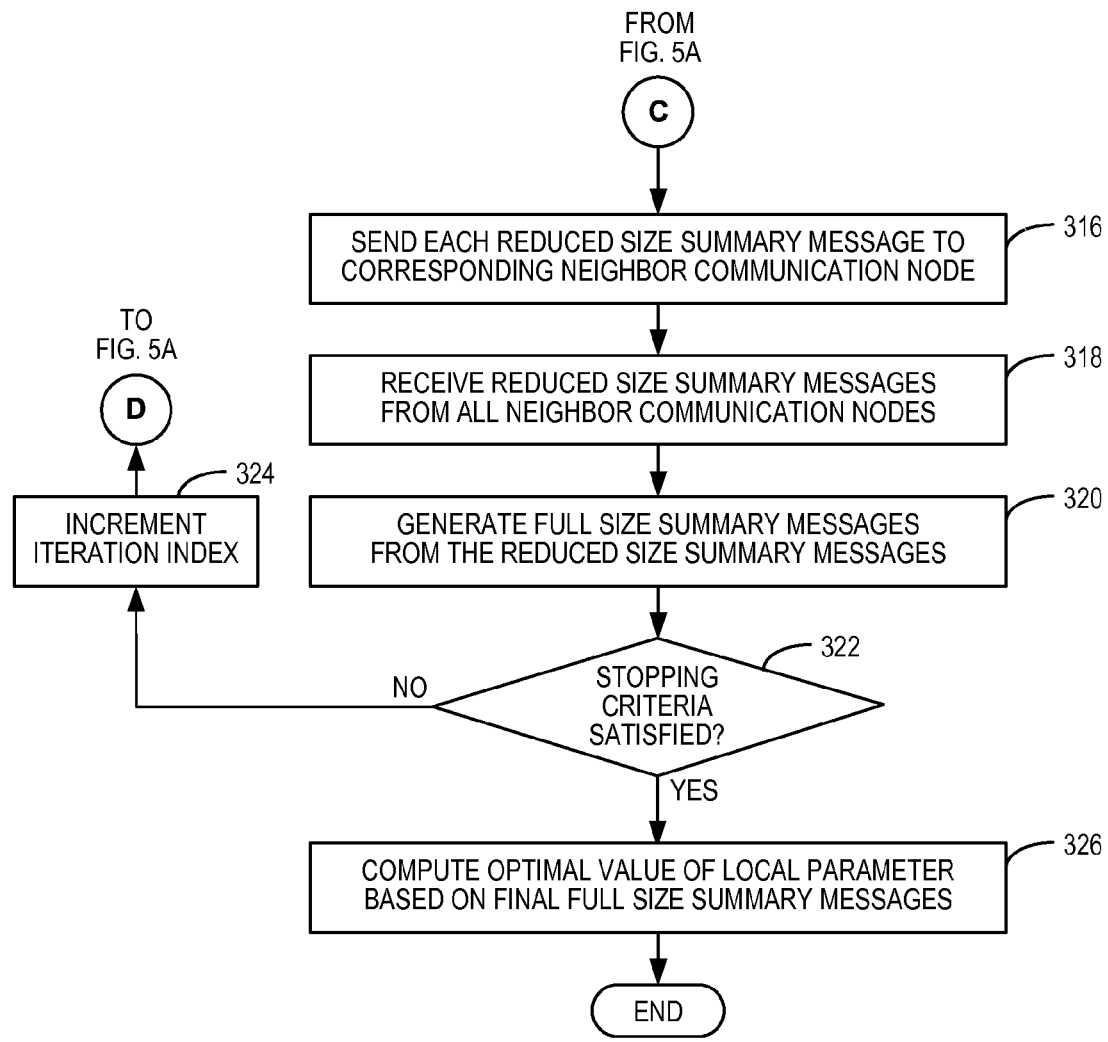
Figure 6A:
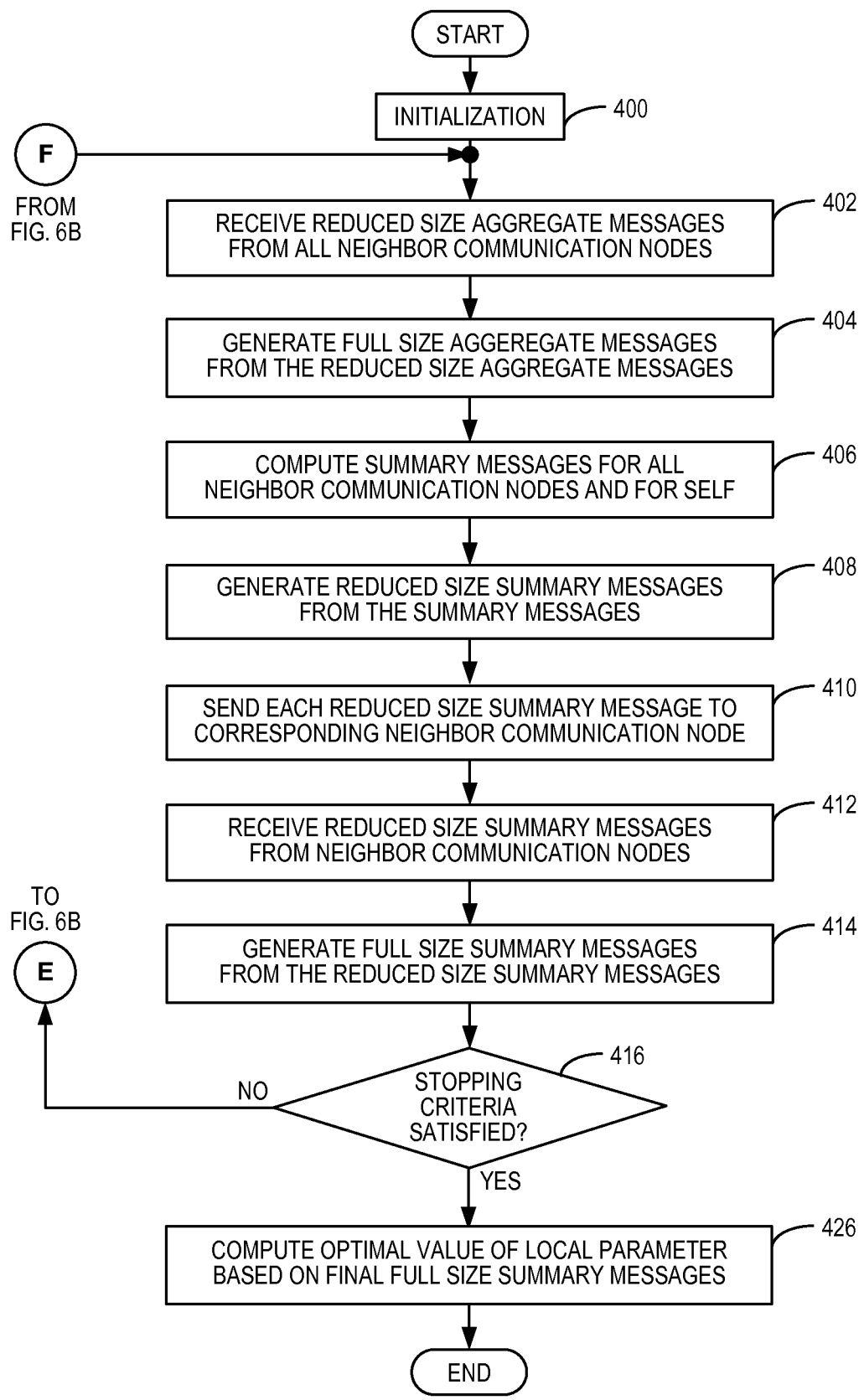
Figure 6B:
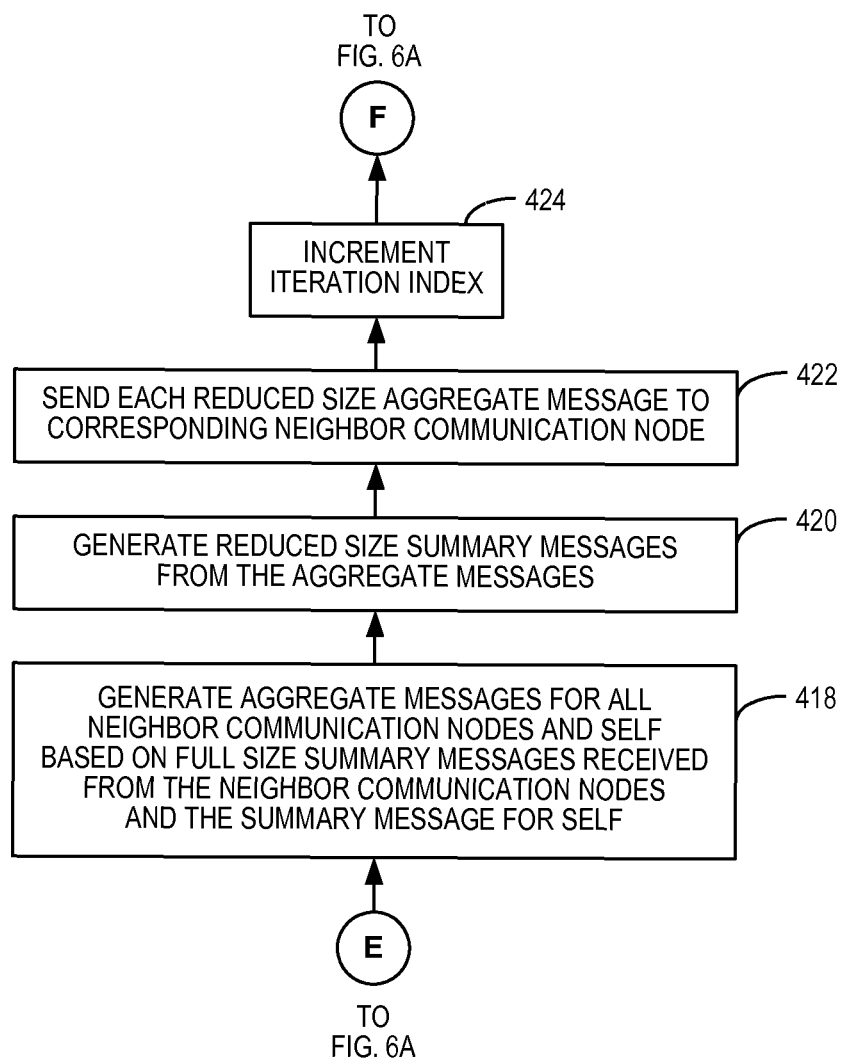
Figure 7:
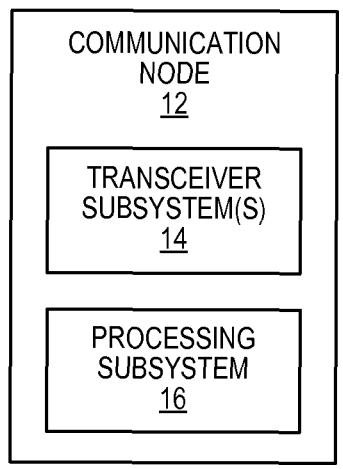

FIG. 3 is a flow chart illustrating the operation of each of the communication nodes to, based on the factor graph modeling the communication nodes in the cellular communications network, iteratively exchange reduced size messages with its neighboring communication nodes to determine an optimal value for its local parameter that together with similarly determined optimal parameters for the other communication nodes in the cellular communications network collectively optimize a global performance metric across the cellular communications network according to one embodiment of the present disclosure;

FIGS. 4A and 4B are a more detailed embodiment of the flow chart of FIG. 3 according to one embodiment of the present disclosure;

FIGS. 5A and 5B are a more detailed embodiment of the flow chart of FIG. 3 according to another embodiment of the present disclosure;

FIGS. 6A and 6B are a more detailed embodiment of the flow chart of FIG. 3 according to another embodiment of the present disclosure; and FIG. 7 is a block diagram of an exemplary communication node.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

One issue with prior approaches for distributed parameter coordination such as that disclosed in U.S. Patent Application Publication No. 2013/0142078 and U.S. Patent Application Publication No. 2013/0142082 is that the amount of information that must be passed between communication nodes according to the associated message-passing algorithms is not specifically addressed. Thus, there is a need for systems and methods for distributed parameter coordination in a communications network (e.g., a cellular or wireless communications network) that reduce the amount of information that must be passed between communication nodes.

Figure 1:
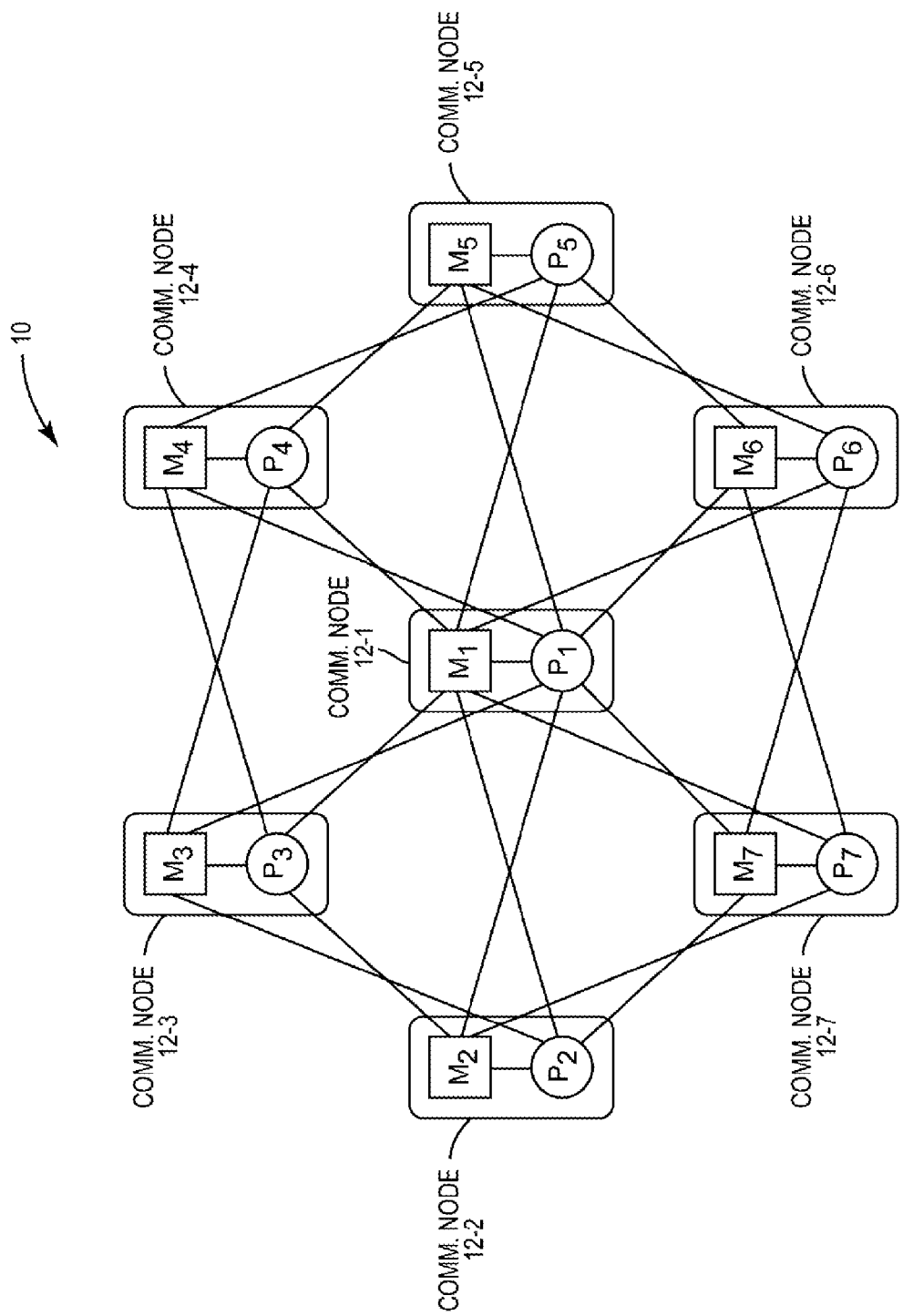
FIG. 1 illustrates a cellular communications network where discrete local parameters to be coordinated among communication nodes in the cellular communications network and their respective performance metrics, or costs, are modeled using a factor graph according to one embodiment of the present disclosure.

In this regard, FIG. 1 illustrates a cellular communications network 10 incorporating systems and methods for distributed parameter coordination using reduced size message exchange according to one embodiment of the present disclosure. Before proceeding, it should be noted that while this disclosure focuses on the cellular communications network 10, the concepts described herein are equally applicable to wired communications networks and other types of wireless communications networks (e.g., WiFi networks). As illustrated, the cellular communications network 10 includes a number of communication nodes 12-1 through 12-7, which are generally referred to herein as communication nodes 12 or individually as communication node 12. The communication nodes 12 may be base stations in the cellular communications network 10, User Equipments (UEs), or mobile stations in the cellular communications network 10, or the like. As used herein, the term "base station" refers to a Node B, an enhanced Node B (eNodeB), or other suitable type of base station in a cellular communications network such as the cellular communications network 10, whereas the term "access node" is a more general term that refers to an access node in any type of wireless communications network (e.g., an access node in a WiFi network or a base station in a cellular communications network). Note that while only seven communication nodes 12 are illustrated for clarity and ease of discussion, it should be appreciated that the cellular communications network 10 may include any number of communication nodes 12.

Considering the cellular communications network 10 with N communication nodes 12, let $p_i$, for i=1, 2, ..., N, denote a discrete local parameter (or vector of two or more discrete local parameters) of the i-th communication node 12 (referred to as communication node i) whose value is drawn from a finite set $\mathcal{P}_i$ of $|\mathcal{P}_i|$ possible parameter values for the i-th communication node i, where $|\mathcal{P}_i|$ denotes the cardinality of $\mathcal{P}_i$. Also, let $p|[p_1, p_2, \ldots, p_N]^T$ be a vector collecting the local parameters of all of the communication nodes 12 in the cellular communications network 10, where $p_i \in \mathcal{P}_i$ for i=1, 2, . . . , N. Each communication node i is associated with a list $\mathcal{N}_i$ of "proper" neighboring communication nodes (i.e., excluding communication node i) whose choices of parameter values can affect the local performance of communication node i. For convenience, also let $\mathcal{A}_i \equiv \mathcal{N}_i \cup \{i\}$ denote the "inclusive" neighbor list of communication node i. Let $p\mathcal{A}_i$ denote the vector of those parameters of nodes in the inclusive neighbor list $\mathcal{A}_i$, with its ordering of parameters determined by the sorted indices in the inclusive neighbor list $\mathcal{A}_i$. Associated with each communication node i is a local performance metric or cost, denoted by $M_i(p\mathcal{A}_i)$, which is a function of those parameters in the inclusive neighbor list $\mathcal{A}_i$ of communication node i. Each communication node i is assumed to be capable of communicating with all communication nodes 12 in the inclusive neighbor list $\mathcal{A}_i$. The goal is for each communication node i to find, in a distributed fashion, its own optimal parameter $p_i^*$, which is the corresponding component of the optimal global parameter vector p* that minimizes a weighted global (or total) performance metric given by:

$$M(p) \equiv \sum_{i=1}^{N} w_i M_i(p_{\mathcal{A}_i}), \quad (1)$$

where $w_i$ denotes a weight associated with the local performance metric $M_i(p\mathcal{A}_i)$. Note that, equivalently, Equation (1) may be rewritten such that each of the weights $w_i$ is incorporated into the corresponding local performance metric $M_i(p\mathcal{A}_i)$. In other words, Equation (1) may equivalently be represented as:

$$M(p) \equiv \sum_{i=1}^{N} M_i(p_{\mathcal{A}_i})$$

where each of the local performance metrics $M_i(p\mathcal{A}_i)$ incorporates the corresponding weight $w_i$ from Equation (1).

The present disclosure provides systems and methods for solving the problem above by modeling the communication nodes 12 and the associated local performance metrics using a factor graph. A factor graph is a bipartite graph consisting of a set of variable nodes and a set of factor nodes. Each variable node represents a variable and can only be connected to a factor node, but not another variable node through an edge, while each factor node represents a function of some of the variables. A factor node is connected to a variable node if and only if the corresponding function represented by the factor node depends on that variable.

For the cellular communications network 10, the local parameters (p) of the communication nodes 12 are represented as variable nodes $v(p_1)$ through $v(p_7)$, and the local metrics (M) of the communication nodes 12 are represented as factor nodes $v(M_1)$ through $v(M_7)$. More specifically, each communication node i is modeled by a variable node that represents the local parameter $p_i$ of communication node i and a factor node that represents the local performance metric $M_i(p\mathcal{A}_i)$ of communication node i. Accordingly, a variable node corresponding to $p_i$ is labeled as $v(p_i)$, and a factor node corresponding to $M_i(p\mathcal{A}_j)$ is labeled as $v(M_i)$. An edge connecting a factor node ($M_i$) with variable node $v(p_k)$ exists if and only if $k \in \mathcal{A}_i$. For example, FIG. 1 shows a hexagonal layout of seven communication nodes 12-1 through 12-7, each associated with a factor node representing the local performance metric $M_i(p\mathcal{A}_j)$ and a variable node representing the local parameter $p_i$. The factor node associated with the local performance metric $M_i(p\mathcal{A}_j)$ of communication node i is connected through edges to the respective variable nodes associated with its own local parameter $p_i$ and those parameters $\{p_j\}_{j \in N_i}$ of its neighboring communication nodes 12 upon which the local performance metric $M_i(p\mathcal{A}_j)$ depends.

Figure 2:
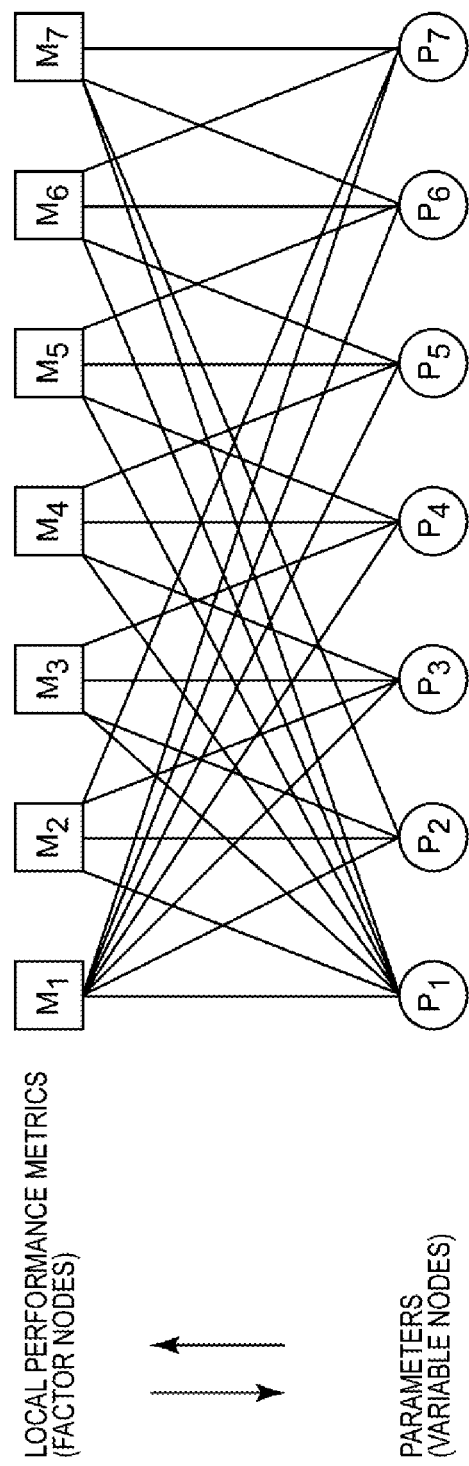
FIG. 2 is a re-organized factor graph for the cellular communications network of FIG. 1 that illustrates relationships between factor nodes that represent local performance metrics of the communication nodes and variable nodes that represent the local parameters of the communication nodes according to one embodiment of the present disclosure.

FIG. 2 is a re-organized factor graph for the cellular communications network 10 of FIG. 1. The re-organized factor graph shows the bipartite property of the factor graph with factor nodes connected only to variable nodes through respective edges. As discussed below, a message passing algorithm is executed based on the factor graph in order to perform distributed coordination of the local parameters (p) of the communication nodes 12 to collectively optimize the global performance metric for the cellular communications network 10. The message passing algorithm is preferably a min-sum algorithm. Those messages that are passed on edges connecting factor and variable nodes for different communication nodes (e.g., communication nodes 12-1 and 12-2) correspond to information exchanged between two neighboring communication nodes 12, while those messages that are passed on edges that connect factor and variable nodes for the same communication node (e.g., communication node 12-1) represent internal communications within those communication nodes 12. Each message depends only on the variable whose associated variable node is a vertex of the edge over which the message is passed along.

The sum-product algorithm can be applied whenever the variables and functions associated with the factor graph are defined on a commutative semi-ring whose elements satisfy the distributive law. For our problem at hand, a variant of the sum-product algorithm is applied that is based on the min-sum commutative semi-ring. In this case, the sum-product algorithm is also called the min-sum algorithm. Recall that a semi-ring is a mathematical structure equivalent to a ring without an additive inverse. A min-sum semi-ring simply replaces the addition operation with the minimum operation and the multiplication operation with the addition operation.

More specifically, let $\mu_{M_i \to p_k}(p_k)$ denote a message, referred to herein as a summary message, to be passed from a factor node $v(M_i)$ to a variable node $v(p_k)$, and let $\mu_{p_k \to M_i}(p_k)$ denote a message, referred to herein as an aggregate message, to be passed from the variable node $v(p_k)$ to the factor node $v(M_i)$. The min-sum algorithm, when applied to our problem at hand, simply iterates between the following two kinds of message computations and exchanges:

$$\mu_{M_i \to p_k}(p_k) = \min_{p_{\mathcal{A}_i \setminus \{k\}}} \left\{ M_i(p_{\mathcal{A}_i}) + \sum_{j \in \mathcal{A}_i \setminus \{k\}} \mu_{p_j \to M_i}(p_j) \right\}, \quad (2)$$

$$\mu_{p_k \to M_i}(p_k) = \sum_{j \in \mathcal{A}_k \setminus \{i\}} \mu_{M_j \to p_k}(p_k). \quad (3)$$

Note that both messages computed in Equations (2) and (3) depend only on the value of $p_k$. Since $p_k \in \mathcal{P}_k$ and $\mathcal{P}_k$ is assumed to be discrete and finite, each of the messages can be represented by a table of $|\mathcal{P}_k|$ entries, where $|\mathcal{P}_k|$ denotes the cardinality of $\mathcal{P}_k$. In Equation (2), the summary message $\mu_{M_i \to p_k}(p_k)$ is a table of $|\mathcal{P}_k|$ values, where each value in the summary message is a minimum value determined from Equation (2) for a corresponding one of the possible values $\mathcal{P}_k$ for $p_k$. In Equation (3), the aggregate message $u_{p_k \to M_i}(p_k)\mu_{p_k \to M_i}(p_k)$ is a table of $|\mathcal{P}_k|$ values, where each value in the aggregate message is a summation of the values from the summary messages $\mu_{M_j \to p_k}(p_k)$ received from communication nodes $j \in \mathcal{A}_k \setminus \{i\}$ (i.e., the neighboring communication nodes 12 in the inclusive list of neighboring communication nodes for communication node k other than communication node i for which the aggregate message is generated).

The min-sum algorithm may begin with each factor node $v(M_i)$ computing an outgoing summary message $\mu_{M_i \to p_k}(p_k)$ to $v(p_k)$ for each $k \in \mathcal{A}_i$ using Equation (2) with all aggregate messages $\mu_{p_k \to M_i}(p_k)$ from connected variable nodes initialized to certain predetermined values. Upon receipt of the summary message $\mu_{M_i \to p_k}(p_k)$, each variable node $v(p_k)$ then computes a summary message $\mu_{p_k \to M_i}(p_k) u_{p_k \to M_i}(p_k)$ to $v(M_i)$ for each $i \in \mathcal{A}_k$. The algorithm then iterates until certain stopping criteria, such as a predetermined maximum number of iterations, is reached, in which case the optimal value for the local parameter for communication node i is determined at its variable node $v(p_1)$ by:

$$p_i^* = \underset{p_i}{\operatorname{argmin}} \left\{ \sum_{j \in \mathcal{A}_i} \mu_{M_j \to p_i}(p_i) \right\}. \tag{4}$$

Note that both messages computed in Equations (2) and (3) depend only on the value of $p_k$. Since $p_k \in \mathcal{P}_k$ and $\mathcal{P}_k$ is assumed to be discrete and finite, each of the messages can be represented by a table of $L_k$ entries, such that:

$$L_k = |\mathcal{P}_k|. \tag{5}$$

In particular, the computation in Equation (3) is just adding up the corresponding entries of multiple tables of the same size together.

To be passed on an edge, each of the $L_k$ entries may be converted into a sequence of bits. Consider that each entry is represented by $N_b$ bits. Then, each table of $L_k$ entries roughly has $L_k^{bits} = \mathcal{N}_b L_k$ bits. The amount of $L_k^{bits}$ bits may cause an undesired overhead over the channel represented by an edge.

To overcome such a potential issue, the summary and aggregate messages of Equations (2) and (3) are processed to generate reduced size summary and aggregate messages that are then passed between the communication nodes 12. More specifically, after computing summary messages $\mu_{M_i \to p_k}(p_k)$ according to Equation (2) and before sending the summary message $\alpha_{M_i \to p_k}(p_k)$ to the corresponding communication nodes 12, the summary messages are processed to generate reduced size summary messages $\mu_{M_i \to p_k}$ defined as:

$$\mu_{M_i \to p_k} = \left[ \min_{p_k \in \mathcal{P}_k} \{\mu_{M_i \to p_k}(p_k)\} \underset{p_k \in \mathcal{P}_k}{\operatorname{argmin}} \{\mu_{M_i \to p_k}(p_k)\} \right]^T. \tag{6}$$

These reduced size summary messages $\mu_{M_i \to p_k}$, rather than the summary messages $\mu_{M_i \to p_k}(p_k)$, are then transmitted to the corresponding communication nodes 12, which in turn reduces the amount of information that needs to be transmitted. Similarly, after generating aggregate messages $\mu_{p_k \to M_i}(p_k)$ according to Equation (3) and before sending the aggregate messages $\mu_{p_k \to M_i}(p_k)$ to the corresponding communication nodes 12, the aggregate messages $\mu_{p_k \to M_i}(p_k)$ are processed to generate reduced size aggregate messages $\mu_{p_k \to M_i}$ defined as:

$$\mu_{p_k \to M_i} = \left[ \min_{p_k \in \mathcal{P}_k} \{\mu_{p_k \to M_i}(p_k)\} \underset{p_k \in \mathcal{P}_k}{\operatorname{argmin}} \{\mu_{p_k \to M_i}(p_k)\} \right]^T. \tag{7}$$

These reduced size aggregate messages $\mu_{p_k \to M_i}$, rather than the aggregate messages $\mu_{p_k \to M_i}(p_k)$, are then transmitted to the corresponding communication nodes, which in turn reduces the amount of information that needs to be transmitted. Assuming the same length $N_b$ for the entries of the message vectors, the size of each vector $\mu_{M_i \to p_k}$ and $\mu_{p_k \to M_i}$ is then given by $$L_k^{reduced} = N_b + \lceil \log_2(L_k) \rceil \text{ bits,}$$

where $\lceil \cdot \rceil$ stands for the smallest following integer. Any argument $p_k$ may be assumed to be an integer index.

In order to maintain the same framework of the min-sum algorithm, the reduced size summary and aggregate messages $\mu_{M_i \to p_k}$ and $\mu_{p_k \to M_i}$ are mapped back to full-size summary and aggregate messages $\tilde{\mu}_{M_i \to p_k}(p_k)$ and $\tilde{\mu}_{p_k \to M_i}(p_k)$. Specifically, in one embodiment, the reduced size summary messages $\mu_{M_i \to p_k}$ are mapped back into full size summary messages $\tilde{\mu}_{M_i \to p_k}(p_k)$ as follows:

$$\tilde{\mu}_{M_i \to p_k}(p_k) = \begin{cases} [\mu_{M_i \to p_k}]_{1,1} & \text{for } p_k = [\mu_{M_i \to p_k}]_{2,1} \neq 0 \\ 0 & \text{otherwise} \end{cases}, \tag{8}$$

where $[\cdot]_{j,1}$ stands for the j th entry of the vector. In this manner, the value from the reduced size summary message $\mu_{M_i \to p_k}$ is inserted into the appropriate location in the table of values forming the full size summary message $\tilde{\mu}_{M_i \to p_k}(p_k)$ while all other locations in the table of values forming the full size summary message $\tilde{\mu}_{M_i \to p_k}(p_k)$ are filled with zeros. Note that the zeros are just one example. The other locations in the table of values forming the full size summary message $\tilde{\mu}_{M_i \to p_k}(p_k)$ may alternatively be filled with another suitable predefined value.

Similarly, in one embodiment, the reduced size aggregate messages $\mu_{p_k \to M_i}$ are mapped back into full size aggregate messages $\tilde{\mu}_{p_k \to M_i}(p_k)$ as follows:

$$\tilde{\mu}_{p_k \to M_i}(p_k) = \begin{cases} [\mu_{p_k \to M_i}]_{1,1} & \text{for } p_k = [\mu_{p_k \to M_i}]_{2,1} \neq 0 \\ 0 & \text{otherwise} \end{cases}. \tag{9}$$

In this manner, the value from the reduced size aggregate message $\mu_{p_k \to M_i}$ is inserted into the appropriate location in the table of values forming the full size aggregate message $\tilde{\mu}_{p_k \to M_i}(p_k)$ while all other locations in the table of values forming the full size aggregate message $\tilde{\mu}_{p_k \to M_i}(p_k)$ are filled with zeros. Note that the zeros are just one example. The other locations in the table of values forming the full size aggregate message $\tilde{\mu}_{p_k \to M_i}(p_k)$ may alternatively be filled with another suitable predefined value.

Using the full size summary and aggregate messages $\tilde{\mu}_{M_i \to p_k}(p_k)$ and $\tilde{\mu}_{p_k \to M_i}(p_k)$, the computation of further summary and aggregate messages is redefined as follows:

$$\bar{\mu}_{M_i \to p_k}(p_k) = \min_{p_{\mathcal{A}_i \setminus \{k\}}} \left\{ M_i(p_{\mathcal{A}_i}) + \sum_{j \in \mathcal{A}_i \setminus \{k\}} \tilde{\mu}_{p_j \to M_i}(p_j) \right\}, \quad (10)$$

for summary messages from $v(M_i)$ to $v(p_k)$, and $$\bar{\mu}_{p_k \to M_i}(p_k) = \sum_{j \in \mathcal{A}_k \setminus \{i\}} \tilde{\mu}_{M_j \to p_k}(p_k), \quad (11)$$

for aggregate messages from $v(p_k)$ to $v(M_i)$. The algorithm iterates until certain stopping criteria, such as a predetermined maximum number of iterations, is reached, in which case the optimal value for the local parameter for communication node i is determined at its variable node $v(p_i)$ by:

$$p_i^* = \operatorname*{argmin}_{p_i} \left\{ \sum_{j \in \mathcal{A}_i} \tilde{\mu}_{M_j \to p_i}(p_i) \right\}. \quad (12)$$

The motivation for characterizing each table by its minimum value comes from the intuition that the minimum value conveys the most significant part of the message from one communication node 12 to the other. The decrease in the amount of information needed to be passed along edges of a factor graph is considerable. To measure the reduction in number of bits, let be the percentage ratio between $L_k^{bits}$ and $L_k^{reduced}$ defined as:

$$\eta = 1 - \frac{L_k^{reduced}}{L_k^{bits}}. \quad (13)$$

For instance, for $L_k=4$ and $\mathcal{N}_b=32$ the reduction is about 73%. When the factor graph contains no cycle, the message passing algorithm described above will yield the exact optimal solution that minimizes the global performance metric (Equation (1)). However, when the factor graph contains cycle, as it often does in many practical applications such as the problem of interest, Equation (4) yields a good approximation to the true optimal solution.

Notably, in the discussion above, each reduced size message $\mu_{M_i \to p_k}$ and $\mu_{p_k \to M_i}$ is generated by taking the minimum value from the corresponding original, full size message $\mu_{M_i \to p_k}(p_k)$ and $\mu_{p_k \to M_i}(p_k)$. However, the present disclosure is not limited thereto. Each reduced size message $\mu_{M_i \to p_k}$ and $\mu_{p_k \to M_i}$ may include any number, but less than all, of the values from the corresponding original, full size message $\mu_{M_i \to p_k}(p_k)$ and $\mu_{p_k \to M_i}(p_k)$. For example, each reduced size message $\mu_{M_i \to p_k}$ and $\mu_{p_k \to M_i}$ may include the lowest 1, 2, or 3 lowest values (but less than all values) from the corresponding original, full size message $\mu_{M_i \to p_k}(p_k)$ and $\mu_{p_k \to M_i}(p_k)$.

FIG. 3 is a flow chart illustrating the operation of one of the communication nodes 12 according to one embodiment of the present disclosure. Note that FIG. 3 is equally applicable to the other communication nodes 12 in the cellular communications network 10 such that, based on the factor graph modeling of the communication nodes 12 in the cellular communications network 10, the communication nodes 12 iteratively exchange messages with their neighboring communication nodes 12 to determine optimal values for their local parameters that collectively optimize the global performance metric across the cellular communications network 10 according to one embodiment of the present disclosure.

As illustrated, the communication node 12 iteratively exchanges reduced size messages with the neighboring communication nodes 12 based on the factor graph until a predefined stopping criteria is satisfied (step 100). In the preferred embodiment, the messages are reduced size summary messages and reduced size aggregate messages generated according to Equations (6) and (7) above. The stopping criteria may be, for example, a predefined maximum number of iterations. However, other stopping criteria may alternatively be used. For example, the stopping criteria may be that the maximum percentage change in all the reduced size summary messages received by a variable node after an iteration is less than a certain predetermined threshold. It should also be noted that the communication node 12 may iteratively exchange the reduced size messages with the neighboring communication nodes 12 according to a predefined schedule. The predefined schedule may be defined such that convergence of the min-sum algorithm is improved. For example, the predefined schedule may be such that on average, 90% of the communication nodes 12 are randomly selected to generate and exchange the reduced size messages in each iteration of the min-sum algorithm (i.e., only 90% of the communication nodes 12 participate when averaged over many iterations; some iterations may have more while some iterations may have less). Conversely, the predefined schedule may be such that on average, 10% of the communication nodes 12 are randomly selected to not participate in each iteration. The random selection process may be carried out by independently generating a pseudo random number at each communication node 12 and comparing it against a threshold predetermined according to the desired faction of communication nodes 12 that participate in each iteration. Once the predefined stopping criteria is satisfied, the communication node 12 determines or otherwise computes the optimal value for the local parameter of the communication node 12 (step 102). In the preferred embodiment, the optimal value is computed according to Equation (12).

FIGS. 4A and 4B are a more detailed embodiment of the flow chart of FIG. 3 according to one embodiment of the present disclosure. Again, while this process is described with respect to one of the communication nodes 12, it should be understood that this process is performed by each of the communication nodes 12 in the cellular communications network 10 in order to determine the optimal values for the local parameters of the communication nodes 12 in a distributed, coordinated manner that optimizes the global performance metric of the cellular communications network 10.

First, the communication node 12 (which for the remaining discussion of FIGS. 4A and 4B is referred to as communication node i) performs an initialization process (step 200). At this point, an iteration index (n) is set to zero (i.e., n=0). During the initialization process, in one embodiment, communication node i initializes an aggregate message of communication node i ($\mu_{p_i \to M_k}^{(0)}(p_i)$) to an initial value, and sends corresponding reduced size aggregate messages $\tilde{\mu}_{p_i \to M_k}^{(0)}(p_i)$ to the neighboring communication nodes $k \in \mathcal{N}_i$. For example, communication node i may set $\mu_{p_i \to M_k}^{(0)}(p_i)=0$ for some value of $p_i$ in $\mathcal{P}_i$ and set $\mu_{p_i \to M_k}^{(0)}(p_i)=\epsilon$ for all other values of $p_i$ in $\mathcal{P}_i$, for all $k \in \mathcal{A}_i$, to indicate initial preference of communication node i, where $\epsilon$ denotes a small positive number such as 0.01. In another embodiment, communication node i initializes the reduced size aggregate messages $\mu_{p_i \to M_k}^{(0)}(p_i)$ to the desired values.

Next, communication node i receives the reduced size aggregate messages $\mu_{p_k \to M_i}^{(n)}$ from all of the neighboring communication nodes $k \in \mathcal{N}_i$ of communication node i (step 202). Specifically, the reduced size aggregate messages $\mu_{p_k \to M_i}^{(n)}$ are received from the variable nodes $v(p_k)$ of all of the neighboring communication nodes $k \in \mathcal{N}_i$ of communication node i.

Communication node i, and specifically the factor node of communication node i, then generates full size aggregate messages $\tilde{\mu}_{p_k \to M_i}^{(n)}(p_k)$ from the reduced size aggregate messages $\mu_{p_k \to M_i}^{(n)}$ received from all of its neighboring communication nodes $k \in \mathcal{N}_i$ (step 204). More specifically, in one embodiment, communication node i generates the full size aggregate messages $\tilde{\mu}_{p_k \to M_i}^{(n)}(p_k)$ according to Equation (9) above. Specifically, the full size aggregate message are computed as:

$$\tilde{\mu}_{p_k \to M_i}^{(n)}(p_k) = \begin{cases} [\mu_{p_k \to M_i}^{(n)}]_{1,1} & \text{for } p_k = [\mu_{p_k \to M_i}^{(n)}]_{2,1} \neq 0 \\ 0 & \text{otherwise} \end{cases}$$

for each received reduced size aggregate message $\mu_{p_k \to M_i}^{(n)}$.

Communication node i, and specifically the factor node of communication node i, then computes summary messages for each of the neighboring communication nodes $k \in \mathcal{N}_i$ of communication node i and a summary message for communication node i itself (step 206). More specifically, the summary messages $\bar{\mu}_{M_i \to p_k}^{(n+1)}(p_k)$ are computed based on Equation (10) above. Specifically, the summary messages $\bar{\mu}_{M_i \to p_k}^{(n+1)}(p_k)$ are computed based on:

$$\bar{\mu}_{M_i \to p_k}^{(n+1)}(p_k) = \min_{p\mathcal{A}_i \setminus \{k\}} \left\{ M_i(p\mathcal{A}_i) + \tilde{\mu}_{p_i \to M_i}^{(n)}(p_i) + \sum_{j \in N_i \setminus \{k\}} \tilde{\mu}_{p_j \to M_i}^{(n)}(p_j) \right\} \quad (14)$$

$$= \min_{p\mathcal{A}_i \setminus \{k\}} \left\{ M_i(p\mathcal{A}_i) + \tilde{\mu}_{p_i \to M_i}^{(n)}(p_i) - \tilde{\mu}_{p_k \to M_i}^{(n)}(p_k) + \sum_{j \in N_i} \tilde{\mu}_{p_j \to M_i}^{(n)}(p_j) \right\}$$

for each neighboring communication node $k \in \mathcal{A}_i$, by hypothesizing each possible value of $p_k$ in $\mathcal{P}_k$ and finding the best corresponding set of parameters $p\mathcal{A}_{i \setminus \{k\}}$ that minimizes the quantity in brackets above. Note that, in one embodiment, the summary messages (and likewise the aggregate messages) passed from the communication node i are reduced size. However, in another embodiment, the summary messages (and likewise the aggregate messages) passed from the communication node i are not reduced size.

More specifically, in order to understand Equation (14), one must first understand that $M_i(p\mathcal{A}_i)$ is essentially a multi-dimensional table that includes a value for the local performance metric for communication node i for each possible combination of values for vector $p\mathcal{A}_i$, which is a vector of the local performance metrics of the inclusive list of neighboring communication nodes $\mathcal{A}_i$ for communication node i. Then, in order to compute the summary message to be sent to communication node k, communication node i first hypothesizes that $p_k$ is one of the possible values in $\mathcal{P}_k$. Then, using the hypothesized value for $p_k$, $M_i(p\mathcal{A}_j)$ becomes a multi-dimensional table for all possible combinations of values for $p\mathcal{A}_j$ with $p_k$ equal to the hypothesized value for $p_k$. Each value in the multi-dimensional table is then summed with a discrete value that is equal to a summation of the values from the full size aggregate message $\tilde{\mu}_{p_j \to M_i}^{(n)}(p_j)$ for $j \in \mathcal{A}_i \setminus \{k\}$ for the hypothesized value for $p_k$. A minimum value from the resulting multi-dimensional table is then determined. A value in the full size summary message $\tilde{\mu}_{M_i \to p_k}^{(n+1)}(p_k)$ corresponding to the hypothesized value for $p_k$ is then set equal to the minimum value determined for the hypothesized value for $p_k$. This process is repeated for each of the other possible values $\mathcal{P}_k$ for $p_k$. In this manner, the full size summary messages $\tilde{\mu}_{M_i \to p_k}^{(n+1)}(p_k)$ are computed for all of communication nodes $k \in \mathcal{A}_i$. Note that to reduce computational complexity, the minimization operation in step 206 can be computed through a standard alternating-coordinate optimization technique, i.e., starting with an arbitrary choice of $p\mathcal{A}_{i \setminus \{k\}}$ and optimizing each parameter in $p\mathcal{A}_{i \setminus \{k\}}$ one at a time while holding the other parameters fixed.

Next, communication node i generates reduced size summary messages $\mu_{M_i \to p_k}^{(n+1)}$ from the summary messages $\bar{\mu}_{M_i \to p_k}^{(n+1)}(p_k)$ computed in step 206 (step 208). More specifically, in one embodiment, communication node i generates the reduced size summary messages $\mu_{M_i \to p_k}^{(n+1)}(p_k)$ from the summary messages $\bar{\mu}_{M_i \to p_k}^{(n+1)}(p_k)$ according to Equation (6) above. Specifically, the reduced size summary messages $\mu_{M_i \to p_k}^{(n+1)}$ are computed as:

$$\mu_{M_i \to p_k}^{(n+1)} = \left[ \min_{p_k \in \mathcal{P}_k} \{\bar{\mu}_{M_i \to p_k}^{(n+1)}(p_k)\} \underset{p_k \in \mathcal{P}_k}{\operatorname{argmin}} \{\bar{\mu}_{M_i \to p_k}^{(n+1)}(p_k)\} \right]^T,$$

for each neighbor communication node $k \in \mathcal{A}_i$, by minimizing $\bar{\mu}_{M_i \to p_k}^{(n+1)}(p_k)$ over $p_k$ to find its minimum and the corresponding argument.

Communication node i then sends each of the reduced size summary messages $\mu_{M_i \to p_k}^{(n+1)}$ for $k \in \mathcal{N}_i$ (i.e., the reduced size summary messages for the proper neighboring communication nodes of communication node i) to the corresponding neighboring communication node k (step 210). Communication node i also receives similarly computed reduced size summary messages $\mu_{M_k \to p_i}^{(n+1)}$ from the proper neighboring communication nodes $k \in \mathcal{N}_i$ of communication node i (step 212).

Communication node i then generates full size summary messages $\tilde{\mu}_{M_k \to p_i}^{(n+1)}(p_i)$ from the reduced size summary messages $\mu_{M_k \to p_i}^{(n+1)}$ received in step 212 (step 214). More specifically, in one embodiment, communication node i then generates the full size summary messages $\tilde{\mu}_{M_k \to p_i}^{(n+1)}(p_i)$ from the reduced size summary messages $\mu_{M_k \to p_i}^{(n+1)}$ received in step 212 according to Equation (8) above. Specifically, the full size summary messages $\tilde{\mu}_{M_k \to p_i}^{(n+1)}(p_i)$ are computed as:

$$\tilde{\mu}_{M_k \to p_i}^{(n+1)}(p_i) = \begin{cases} [\mu_{M_k \to p_i}^{(n+1)}]_{1,1} & \text{for } p_i = [\mu_{M_k \to p_i}^{(n+1)}]_{2,1} \neq 0 \\ 0 & \text{otherwise} \end{cases},$$

for each received reduced size summary message $\mu_{M_k \to p_i}^{(n+1)}$.

Next, communication node i generates aggregate messages $\bar{\mu}_{p_i \to M_k}^{(n+1)}(p_i)$ for $k \in \mathcal{N}_i$ (i.e., for each of the proper neighboring communication nodes $k \in \mathcal{N}_i$ of communication node i) as well as an aggregate message $\bar{\mu}_{p_i \to M_k}^{(n+1)}(p_i)$ for k={i} (i.e., for communication node i itself) (step 216). More specifically, communication node i generates the aggregate messages $\bar{\mu}_{p_i \to M_k}^{(n+1)}(p_i)$ according to Equation (11) above. Specifically, communication node i generates the aggregate messages based on:

$$\bar{\mu}_{p_i \to M_k}^{(n+1)}(p_i) = \tilde{\mu}_{M_i \to p_i}^{(n+1)}(p_i) + \sum_{j \in N_i \setminus \{k\}} \tilde{\mu}_{M_j \to p_i}^{(n+1)}(p_i) \quad (15)$$

$$= \tilde{\mu}_{M_i \to p_i}^{(n+1)}(p_i) - \tilde{\mu}_{M_k \to p_i}^{(n+1)}(p_i) + \sum_{j \in N_i} \tilde{\mu}_{M_j \to p_i}^{(n+1)}(p_i)$$

for each neighboring communication node $k \in \mathcal{A}_i$ by summing the full size summary messages $\{\tilde{\mu}_{M_j \to p_i}^{(n+1)}(p_i)\}_{j \in N_i}$.

Next, communication node i generates reduced size aggregate messages $\mu_{p_i \to M_k}^{(n+1)}$ from the aggregate messages $\bar{\mu}_{p_i \to M_k}^{(n+1)}(p_i)$ computed in step 216 (step 218). More specifically, in one embodiment, communication node i generates the reduced size aggregate messages $\mu_{p_i \to M_k}^{(n+1)}$ according to Equation (7) above. Specifically, the reduced size aggregate messages $\mu_{p_i \to M_k}^{(n+1)}$ are computed according to:

$$\mu_{p_i \to M_k}^{(n+1)} = \left[ \min_{p_i \in \mathcal{P}_i} \{\bar{\mu}_{p_i \to M_k}^{(n+1)}(p_i)\} \operatorname*{argmin}_{p_i \in \mathcal{P}_i}\{\bar{\mu}_{p_i \to M_k}^{(n+1)}(p_i)\} \right]^T$$

for each neighboring communication node $k \in \mathcal{A}_i$, by minimizing $\bar{\mu}_{p_i \to M_k}^{(n+1)}(p_i)$ over $p_i$ to find its minimum and the corresponding argument.

Communication node i then sends each of the reduced size aggregate messages $\mu_{p_i \to M_k}^{(n+1)}$ to the corresponding neighboring communication node k (step 220). In this embodiment, communication node i next determines whether the predefined stopping criteria has been satisfied (step 222). If not, the iteration index is incremented (step 224), and the process returns to step 202 and is repeated. If the predefined stopping criteria has been satisfied, communication node i computes an optimal value $p_i^*$ for the local parameter of communication node i based on the full size summary messages from the final iteration (i.e., the final full size summary messages) (step 226). More specifically, the optimal value $p_i^*$ for the local parameter of communication node i is computed based on:

$$p_i^* = \operatorname*{argmin}_{p_i} \left\{ \sum_{j \in \mathcal{A}_i} \tilde{\mu}_{M_j \to p_i}^{(n_f)}(p_i) \right\},$$

which returns one of the possible values for the local parameter $p_i$ of communication node i that corresponds to the minimum value in the table resulting from the summation of the final full size summary messages.

FIGS. 5A and 5B are a more detailed embodiment of the flow chart of FIG. 3 according to another embodiment of the present disclosure. Notably, FIGS. 5A and 5B are substantially the same as FIGS. 4A and 4B but where the stopping criteria is checked after sending and receiving reduced size summary messages rather than after generating and sending the reduced size aggregate messages as in FIGS. 4A and 4B. Again, while this process is described with respect to one of the communication nodes 12, it should be understood that this process is performed by each of the communication nodes 12 in the cellular communications network 10 in order to determine the optimal values for the local parameters of the communication nodes 12 in a distributed, coordinated manner that optimizes the global performance metric of the cellular communications network 10.

First, the communication node 12 (which for the remaining discussion of FIG. 5 is referred to as communication node i) performs an initialization process (step 300). At this point, an iteration index (n) is set to zero (i.e., n=0). During the initialization process, communication node i initializes all messages to predetermined values. In particular, communication node i initializes full size summary messages $\tilde{\mu}_{M_k \to p_i}^{(0)}(p_i)$ to some desired initial value(s) for all neighboring communication nodes $k \in \mathcal{A}_i$. This may be independently done by communication node i or done in a collaborative manner by exchanging some initial messages with the neighboring communication nodes $k \in \mathcal{A}_i$.

Communication node i then generates aggregate messages $\bar{\mu}_{p_i \to M_k}^{(n)}(p_i)$ for $k \in \mathcal{N}_i$ (i.e., for each of the proper neighboring communication nodes of communication node i) as well as an aggregate message $\bar{\mu}_{p_i \to M_k}^{(n)}(p_i)$ for k={i} (i.e., for communication node i itself) (step 302). More specifically, communication node i generates the aggregate messages $\bar{\mu}_{p_i \to M_k}^{(n)}(p_i)$ according to Equation (11) above. Specifically, communication node i generates the aggregate messages based on:

$$\bar{\mu}_{p_i \to M_k}^{(n)}(p_i) = \tilde{\mu}_{M_i \to p_i}^{(n)}(p_i) + \sum_{j \in N_i \setminus \{k\}} \tilde{\mu}_{M_j \to p_i}^{(n)}(p_i) \quad (16)$$

$$= \tilde{\mu}_{M_i \to p_i}^{(n)}(p_i) - \tilde{\mu}_{M_k \to p_i}^{(n)}(p_i) + \sum_{j \in N_i} \tilde{\mu}_{M_j \to p_i}^{(n)}(p_i)$$

for each neighboring communication node $k \in \mathcal{A}_i$ by summing the full size summation messages $\{\tilde{\mu}_{M_j \to p_i}^{(n)}(p_i)\}_{j \in \mathcal{N}_i}$.

Next, communication node i generates reduced size aggregate messages $\mu_{p_i \to M_k}^{(n)}$ from the aggregate messages $\bar{\mu}_{p_i \to M_k}^{(n)}(p_i)$ computed in step 302 (step 304). More specifically, in one embodiment, communication node i generates the reduced size aggregate messages $\mu_{p_i \to M_k}^{(n)}$ according to Equation (7) above. Specifically, the reduced size aggregate messages $\mu_{p_i \to M_k}^{(n)}$ are computed according to:

$$\mu_{p_i \to M_k}^{(n)} = \left[ \min_{p_i \in \mathcal{P}_i} \{\bar{\mu}_{p_i \to M_k}^{(n)}(p_i)\} \operatorname*{argmin}_{p_i \in \mathcal{P}_i}\{\bar{\mu}_{p_i \to M_k}^{(n)}(p_i)\} \right]^T$$

for each neighboring communication node $k \in \mathcal{A}_i$, by minimizing $\bar{\mu}_{p_i \to M_k}^{(n)}(p_i)$ over $p_i$ to find its minimum and the corresponding argument.

Communication node i then sends each of the reduced size aggregate messages $\mu_{p_i \to M_k}^{(n)}$ to the corresponding neighboring communication node k (step 306). Next, communication node i receives reduced size aggregate messages $\mu_{p_k \to M_i}^{(n)}$ from all of the neighboring communication nodes $k \in \mathcal{N}_i$ of communication node i (step 308). Specifically, the reduced size aggregate messages $\mu_{p_k \to M_i}^{(n)}$ are received from the variable nodes $v(p_k)$ of all neighboring communication nodes $k \in \mathcal{N}_i$ of communication node i.

Next, communication node i, and specifically the factor node of communication node i, generates full size aggregate messages $\tilde{\mu}_{p_k \to M_i}^{(n)}(p_k)$ from the reduced size aggregate messages $\mu_{p_k \to M_i}^{(n)}$ received in step 308 (step 310). More specifically, in one embodiment, communication node i generates the full size aggregate messages $\tilde{\mu}_{p_k \to M_i}^{(n)}(p_k)$ according to Equation (9) above. Specifically, the full size aggregate messages $\tilde{\mu}_{p_k \to M_i}^{(n)}(p_k)$ are computed as:

$$\tilde{\mu}_{p_k \to M_i}^{(n)}(p_k) = \begin{cases} [\mu_{p_k \to M_i}^{(n)}]_{1,1} & \text{for } p_k = [\mu_{p_k \to M_i}^{(n)}]_{2,1} \neq 0 \\ 0 & \text{otherwise} \end{cases} \quad 5$$

for each received reduced size aggregate message $\mu_{p_k \to M_i}^{(n)}$.

Communication node i, and specifically the factor node of communication node i, then computes summary messages for each of the neighboring communication nodes $k \in \mathcal{N}_i$ of communication node i and a summary message for communication node i itself (step 312). More specifically, the summary messages $\bar{\mu}_{M_i \to p_k}^{(n+1)}(p_k)$ are computed based on Equation (10) above. Specifically, the summary messages $\bar{\mu}_{M_i \to p_k}^{(n+1)}(p_k)$ are computed based on:

$$\bar{\mu}_{M_i \to p_k}^{(n+1)}(p_k) = \min_{p_{\mathcal{A}_i \setminus \{k\}}} \left\{ M_i(p_{\mathcal{A}_i}) + \tilde{\mu}_{p_i \to M_i}^{(n)}(p_i) + \sum_{j \in N_i \setminus \{k\}} \tilde{\mu}_{p_j \to M_i}^{(n)}(p_j) \right\}$$

$$= \min_{p_{\mathcal{A}_i \setminus \{k\}}} \left\{ M_i(p_{\mathcal{A}_i}) + \tilde{\mu}_{p_i \to M_i}^{(n)}(p_i) - \tilde{\mu}_{p_k \to M_i}^{(n)}(p_k) + \sum_{j \in N_i} \tilde{\mu}_{p_j \to M_i}^{(n)}(p_j) \right\}$$

for each neighboring communication node $k \in \mathcal{A}_i$, by hypothesizing each possible value of $p_k$ in $\mathcal{P}_k$ and finding the best corresponding set of parameters $p_{\mathcal{A}_i \setminus \{k\}}$ that minimizes the quantity in brackets above, as discussed above with respect to step 206 of FIG. 4A.

Communication node i generates reduced size summary messages $\mu_{M_i \to p_k}^{(n+1)}$ from the summary messages $\bar{\mu}_{M_i \to p_k}^{(n+1)}(p_k)$ computed in step 312 (step 314). More specifically, in one embodiment, communication node i generates reduced size summary messages $\mu_{M_i \to p_k}^{(n+1)}$ from the summary messages $\bar{\mu}_{M_i \to p_k}^{(n+1)}(p_k)$ computed in step 312 based on Equation (6). Specifically, the reduced size summary messages $\mu_{M_i \to p_k}^{(n+1)}$ are computed based on:

$$\mu_{M_i \to p_k}^{(n+1)} = \left[ \min_{p_k \in \mathcal{P}_k} \{\bar{\mu}_{M_i \to p_k}^{(n+1)}(p_k)\} \operatorname*{argmin}_{p_k \in \mathcal{P}_k} \{\bar{\mu}_{M_i \to p_k}^{(n+1)}(p_k)\} \right]^T,$$

for each neighbor communication node $k \in \mathcal{A}_i$, by minimizing $\mu_{M_i \to p_k}^{(n+1)}(p_k)$ over $p_k$ to find its minimum and the corresponding argument.

Communication node i then sends each of the reduced size summary messages $\mu_{M_i \to p_k}^{(n+1)}$ for $k \in \mathcal{N}_i$ (i.e., the reduced size summary messages for the proper neighboring communication nodes of communication node i) to the corresponding neighboring communication node k (step 316). Communication node i also receives similarly computed reduced size summary messages $\mu_{M_k \to p_i}^{(n+1)}$ from the proper neighboring communication nodes $k \in \mathcal{N}_i$ of communication node i (step 318).

Communication node i then generates full size summary messages $\mu_{M_k \to p_i}^{(n+1)}(p_i)$ from the reduced size summary messages $\mu_{M_k \to p_i}^{(n+1)}$ received in step 318 (step 320). More specifically, communication node i generates the full size summary messages $\mu_{M_k \to p_i}^{(n+1)}(p_i)$ from the reduced size summary messages $\mu_{M_k \to p_i}^{(n+1)}$ received in step 318 based on Equation (8) above. Specifically, the full size summary messages $\mu_{M_k \to p_i}^{(n+1)}(p_i)$ are computed based on:

$$\tilde{\mu}_{M_k \to p_i}^{(n+1)}(p_i) = \begin{cases} [\mu_{M_k \to p_i}^{(n+1)}]_{1,1} & \text{for } p_i = [\mu_{M_k \to p_i}^{(n+1)}]_{2,1} \neq 0 \\ 0 & \text{otherwise} \end{cases},$$

for each received reduced size summary message $\mu_{M_k \to p_i}^{(n+1)}$.

Next, in this embodiment, communication node i determines whether the predefined stopping criteria has been satisfied (step 322). If not, the iteration index is incremented (step 324), and the process returns to step 302 and is repeated. If the predefined stopping criteria has been satisfied, communication node i computes an optimal value $p_i^*$ for the local parameter of communication node i based on the full size summary messages from the final iteration (i.e., the final full size summary messages) (step 326). More specifically, the optimal value $p_i^*$ for the local parameter of communication node i is computed based on:

$$p_i^* = \operatorname*{argmin}_{p_i} \left\{ \sum_{j \in \mathcal{A}_i} \mu_{M_j \to p_i}^{(n_f)}(p_i) \right\}. \quad (17)$$

Equation (17) returns one of the possible values for the local parameter $p_i$ of communication node i that corresponds to the minimum value in the table resulting from the summation of the final full size summary messages.

FIGS. 6A and 6B are a more detailed embodiment of the flow chart of FIG. 3 according to another embodiment of the present disclosure. This embodiment is similar to the embodiment of FIGS. 4A and 4B but where steps 216 through 220 of FIG. 4B are performed only if the predetermined stopping criterion, or criteria, is not satisfied. Again, while this process is described with respect to one of the communication nodes 12, it should be understood that this process is performed by each of the communication nodes 12 in the cellular communications network 10 in order to determine the optimal values for the local parameters of the communication nodes 12 in a distributed, coordinated manner that optimizes the global performance metric of the cellular communications network 10.

First, the communication node 12 (which for the remaining discussion of FIGS. 6A and 6B is referred to as communication node i) performs an initialization process (step 400). At this point, an iteration index (n) is set to zero (i.e., n=0). During the initialization process, in one embodiment, communication node i initializes an aggregate message of communication node i ($\mu_{p_i \to M_k}^{(0)}(p_i)$) to an initial value, and sends corresponding reduced size aggregate messages $\mu_{p_i \to M_k}^{(0)}(p_i)$ to the neighboring communication nodes $k \in \mathcal{N}_i$. For example, communication node i may set $\mu_{p_i \to M_k}^{(0)}(p_i)=0$ for some value of $p_i$ in $\mathcal{P}_i$ and set $\mu_{p_i \to M_k}^{(0)}(p_i)=\epsilon$ for all other values of $p_i$ in $\mathcal{P}_i$, for all neighboring communication nodes $k \in \mathcal{A}_i$, to indicate initial preference of communication node i where $\epsilon$ denotes a small positive number such as 0.01. In another embodiment, communication node i initializes the reduced size aggregate messages $\mu_{p_i \to M_k}^{(0)}(p_i)$ to the desired values.

Next, communication node i receives the reduced size aggregate messages $\mu_{p_k \to M_i}^{(n)}$ from all of the neighboring communication nodes $k \in \mathcal{N}_i$ of communication node i (step 402). Specifically, the reduced size aggregate messages $\mu_{p_k \to M_i}^{(n)}$ are received from the variable nodes $v(p_k)$ of all of the neighboring communication nodes $k \in \mathcal{N}_i$ of communication node i.

Communication node i, and specifically the factor node of communication node i, then generates full size aggregate messages $\tilde{\mu}_{p_k \to M_i}^{(n)}(p_k)$ from the reduced size aggregate messages $\mu_{p_k \to M_i}^{(n)}$ received from all of its neighboring communication nodes $k \in \mathcal{N}_i$ (step 404). More specifically, in one embodiment, communication node i generates the full size aggregate messages $\tilde{\mu}_{p_k \to M_i}^{(n)}(p_k)$ according to Equation (9) above. Specifically, the full size aggregate message $\tilde{\mu}_{p_k \to M_i}^{(n)}(p_k)$ are computed as:

$$\tilde{\mu}_{p_k \to M_i}^{(n)}(p_k) = \begin{cases} [\mu_{p_k \to M_i}^{(n)}]_{1,1} & \text{for } p_k = [\mu_{p_k \to M_i}^{(n)}]_{2,1} \neq 0 \\ 0 & \text{otherwise} \end{cases}$$

for each received reduced size aggregate message $\mu_{p_k \to M_i}^{(n)}$.

Communication node i, and specifically the factor node of communication node i, then computes summary messages for each of the neighboring communication nodes $k \in \mathcal{N}_i$ of communication node i and a summary message for communication node i itself (step 406). More specifically, the summary messages $\bar{\mu}_{M_i \to p_k}^{(n+1)}(p_k)$ are computed based on Equation (10) above. Specifically, the summary messages $\bar{\mu}_{M_i \to p_k}^{(n+1)}(p_k)$ are computed based on:

$$\bar{\mu}_{M_i \to p_k}^{(n+1)}(p_k) = \min_{p\mathcal{A}_i \setminus \{k\}} \left\{ M_i(p\mathcal{A}_i) + \tilde{\mu}_{p_i \to M_i}^{(n)}(p_i) + \sum_{j \in N_i \setminus \{k\}} \tilde{\mu}_{p_j \to M_i}^{(n)}(p_j) \right\} \quad (18)$$

$$= \min_{p\mathcal{A}_i \setminus \{k\}} \left\{ M_i(p\mathcal{A}_i) + \tilde{\mu}_{p_i \to M_i}^{(n)}(p_i) - \tilde{\mu}_{p_k \to M_i}^{(n)}(p_k) + \sum_{j \in N_i} \tilde{\mu}_{p_j \to M_i}^{(n)}(p_j) \right\}$$

for each neighboring communication node $k \in \mathcal{A}_i$, by hypothesizing each possible value of $p_k$ in $\mathcal{P}_k$ and finding the best corresponding set of parameters $p\mathcal{A}_i \setminus \{k\}$ that minimizes the quantity in brackets above. Note that, in one embodiment, the summary messages (and likewise the aggregate messages) passed from the communication node i are reduced size. However, in another embodiment, the summary messages (and likewise the aggregate messages) passed from the communication node i are not reduced size.

More specifically, in order to understand Equation (18), one must first understand that $M_i(p\mathcal{A}_i)$ is essentially a multi-dimensional table that includes a value for the local performance metric for communication node i for each possible combination of values for vector $p\mathcal{A}_i$, which is a vector of the local performance metrics of the inclusive list $\mathcal{A}_i$ of neighboring communication nodes $k \in \mathcal{A}_i$ for communication node i. Then, in order to compute the summary message to be sent to communication node k, communication node i first hypothesizes that $p_k$ is one of the possible values in $\mathcal{P}_k$. Then, using the hypothesized value for $p_k$, $M_i(p\mathcal{A}_i)$ becomes a multi-dimensional table for all possible combinations of values for $p\mathcal{A}_i$ with $p_k$ equal to the hypothesized value for $p_k$. Each value in the multi-dimensional table is then summed with a discrete value that is equal to a summation of the values from the full size aggregate message $\tilde{\mu}_{p_j \to M_i}^{(n)}(p_j)$ for $j \in \mathcal{A}_i \setminus \{k\}$ for the hypothesized value for $p_k$. A minimum value from the resulting multi-dimensional table is then determined. A value in the full size summary message $\tilde{\mu}_{M_i \to p_k}^{(n+1)}(p_k)$ corresponding to the hypothesized value for $p_k$ is then set equal to the minimum value determined for the hypothesized value for $p_k$. This process is repeated for each of the other possible values $\mathcal{P}_k$ for $p_k$. In this manner, the summary messages $\tilde{\mu}_{M_i \to p_k}^{(n+1)}(p_k)$ are computed for all of communication nodes $k \in \mathcal{A}_i$. Note that to reduce computational complexity, the minimization operation in step 406 can be computed through a standard alternating-coordinate optimization technique, i.e., starting with an arbitrary choice of $p\mathcal{A}_i \setminus \{k\}$ and optimizing each parameter in $p\mathcal{A}_i \setminus \{k\}$ one at a time while holding the other parameters fixed.

Next, communication node i generates reduced size summary messages $\mu_{M_i \to p_k}^{(n+1)}$ from the summary messages $\bar{\mu}_{M_i \to p_k}^{(n+1)}(p_k)$ computed in step 406 (step 408). More specifically, in one embodiment, communication node i generates the reduced size summary messages $\mu_{M_i \to p_k}^{(n+1)}$ from the summary messages $\bar{\mu}_{M_i \to p_k}^{(n+1)}(p_k)$ according to Equation (6) above. Specifically, the reduced size summary messages $\mu_{M_i \to p_k}^{(n+1)}$ are computed as:

$$\mu_{M_i \to p_k}^{(n+1)} = \left[ \min_{p_k \in \mathcal{P}_k} \{\bar{\mu}_{M_i \to p_k}^{(n+1)}(p_k)\} \operatorname*{argmin}_{p_k \in \mathcal{P}_k} \{\bar{\mu}_{M_i \to p_k}^{(n+1)}(p_k)\} \right]^T,$$

for each neighbor communication node $k \in \mathcal{A}_i$, by minimizing $\bar{\mu}_{M_i \to p_k}^{(n+1)}(p_k)$ over $p_k$ to find its minimum and the corresponding argument.

Communication node i then sends each of the reduced size summary messages $\mu_{M_i \to p_k}^{(n+1)}$ for $k \in \mathcal{N}_i$ (i.e., the reduced size summary messages for the proper neighboring communication nodes of communication node i) to the corresponding neighboring communication node k (step 410). Communication node i also receives similarly computed reduced size summary messages $\mu_{M_k \to p_i}^{(n+1)}$ from the proper neighboring communication nodes $k \in \mathcal{N}_i$ of communication node i (step 412).

Communication node i then generates full size summary messages $\tilde{\mu}_{M_k \to p_i}^{(n+1)}(p_i)$ from the reduced size summary messages $\mu_{M_k \to p_i}^{(n+1)}$ received in step 412 (step 414). More specifically, in one embodiment, communication node i then generates the full size summary messages $\tilde{\mu}_{M_k \to p_i}^{(n+1)}(p_i)$ from the reduced size summary messages $\mu_{M_k \to p_i}^{(n+1)}$ received in step 412 according to Equation (8) above. Specifically, the full size summary messages $\tilde{\mu}_{M_k \to p_i}^{(n+1)}(p_i)$ are computed as:

$$\tilde{\mu}_{M_k \to p_i}^{(n+1)}(p_i) = \begin{cases} [\mu_{M_k \to p_i}^{(n+1)}]_{1,1} & \text{for } p_i = [\mu_{M_k \to p_i}^{(n+1)}]_{2,1} \neq 0 \\ 0 & \text{otherwise} \end{cases},$$

for each received reduced size summary message $\mu_{M_k \to p_i}^{(n+1)}$.

In this embodiment, communication node i next determines whether the predefined stopping criteria has been satisfied (step 416). If not, communication node i generates aggregate messages $\bar{\mu}_{p_i \to M_k}^{(n+1)}(p_i)$ for $k \in \mathcal{N}_i$ (i.e., for each of the proper neighboring communication nodes of communication node i) as well as an aggregate message $\bar{\mu}_{p_i \to M_i}^{(n+1)}(p_i)$ for $k=\{i\}$ (i.e., for communication node i itself) (step 418). More specifically, communication node i generates the aggregate messages $\bar{\mu}_{p_i \to M_k}^{(n+1)}(p_i)$ according to Equation (11) above. Specifically, communication node i generates the aggregate messages based on:

$$\bar{\mu}_{p_i \to M_k}^{(n+1)}(p_i) = \tilde{\mu}_{M_i \to p_i}^{(n+1)}(p_i) + \sum_{j \in N_i \setminus \{k\}} \tilde{\mu}_{M_j \to p_i}^{(n+1)}(p_i)$$

$$= \tilde{\mu}_{M_i \to p_i}^{(n+1)}(p_i) - \tilde{\mu}_{M_k \to p_i}^{(n+1)}(p_i) + \sum_{j \in N_i} \tilde{\mu}_{M_j \to p_i}^{(n+1)}(p_i)$$

for each neighboring communication node $k \in \mathcal{A}_i$ by summing the full size summary messages $\{\tilde{\mu}_{M_j \to p_i}^{(n+1)}\}_{j \in \mathcal{N}_i}$.

Next, communication node i generates reduced size aggregate messages $\mu_{p_i \to M_k}^{(n+1)}$ from the aggregate messages $\bar{\mu}_{p_i \to M_k}^{(n+1)}(p_i)$ computed in step 418 (step 420). More specifically, in one embodiment, communication node i generates the reduced size aggregate messages $\mu_{p_i \to M_k}^{(n+1)}$ according to Equation (7) above. Specifically, the reduced size aggregate messages $\mu_{p_i \to M_k}^{(n+1)}$ are computed according to:

$$\mu_{p_i \to M_k}^{(n+1)} = \left[ \min_{p_i \in \mathcal{P}_i} \{\bar{\mu}_{p_i \to M_k}^{(n+1)}(p_i)\} \underset{p_i \in \mathcal{P}_i}{\operatorname{argmin}} \{\bar{\mu}_{p_i \to M_k}^{(n+1)}(p_i)\} \right]^T$$

for each neighboring communication node $k \in \mathcal{A}_i$, by minimizing $\bar{\mu}_{p_i \to M_k}^{(n+1)}(p_i)$ over $p_i$ to find its minimum and the corresponding argument.

Communication node i then sends each of the reduced size aggregate messages $\mu_{p_i \to M_k}^{(n+1)}$ to the corresponding neighboring communication node k (step 422). At this point, the iteration index is incremented (step 424) and the process returns to step 402 and is repeated. Returning to step 416, if the predefined stopping criteria has been satisfied, communication node i computes an optimal value $p_i^*$ for the local parameter of communication node i based on the full size summary messages from the final iteration (i.e., the final full size summary messages) (step 226). More specifically, the optimal value $p_i^*$ for the local parameter of communication node i is computed based on:

$$p_i^* = \underset{p_i}{\operatorname{argmin}} \left\{ \sum_{j \in \mathcal{A}_i} \tilde{\mu}_{M_j \to p_i}^{(n_f)}(p_i) \right\},$$

which returns one of the possible values for the local parameter $p_i$ of communication node i that corresponds to the minimum value in the table resulting from the summation of the final full size summary messages. Notably, the equation above shows that the computation of the optimal value $p_i^*$ does not directly depend on the aggregate messages generated in step 418. Therefore, steps 418 through 422 do not need to be performed for the last iteration.

While numerous applications of the systems and methods described herein will be appreciated by those of ordinary skill in the art, the following is a description of several exemplary applications. As a first example, each local parameter $p_i$ may represent an index to a frequency band out of a set $\mathcal{P}_i$ of all possible frequency bands for communication node i, and the global performance metric is defined to solve the frequency reuse planning problem. More specifically, the global performance metric is defined such that the min-sum algorithm minimizes the number of "collisions" in using the same frequency band in adjacent cells or base stations. In this case, the local performance metric may be chosen as:

$$M_i(p_{\mathcal{A}_i}) = \sum_{j \in N_i} \delta(p_i, p_j),$$

where $\delta(x, y) = 1$ if $x = y$, and otherwise $\delta(x, y) = 0$. Another possible choice of the local performance metric that often leads to fast convergence is:

$$M_i(p_{\mathcal{A}_i}) = \sum_{j \in N_i} \delta(p_i, p_j) + \sum_{\substack{k,l \in N_i \\ k \in (\cup_{m \in N_l} N_m) \setminus \mathcal{A}_k \\ l \in (\cup_{m \in N_k} N_m) \setminus \mathcal{A}_l}} (1 - \delta(p_k, p_l)),$$

where the second term encourages second-tier neighboring communication nodes to select the same frequency band. Yet another possible choice of the local performance metric is $$M_i(p_{\mathcal{A}_i}) = \frac{1}{2} \sum_{\substack{j,k \in \mathcal{A}_i \\ k \in N_j}} \delta(p_k, p_j)$$

which counts all "collisions" between neighboring communication nodes within the neighborhood defined by $\mathcal{A}_i$.

As a second example, each local parameter $p_i$ may represent an index to a Reference Signal (RS) out of a set $\mathcal{P}_i$ of all possible RSs for communication node i. Here, the communication nodes 12 are access nodes in the cellular communications network 10, and the goal is to find the best combinations of RSs for all access nodes so that the sum of maximum cross-correlation between RSs in adjacent cells or access nodes is minimized. In this case the local performance metric may be chosen as:

$$M_i(p_{\mathcal{A}_i}) = \sum_{j \in N_i} \max_{|\tau| \leq L_{max}} |R_{s(p_i)s(p_j)}(\tau)|,$$

where $s(p_i)$ denotes the RS indexed by $p_i$, $L_{max}$ denotes the maximum correlation lag of interest which may be determined by the maximum allowable channel delay spread in the cellular communications network 10, and $$R_{s_1 s_2}(\tau) \equiv \frac{1}{N_s} \sum_m s_1(m) s_2^*(m - \tau)$$

denotes the cross-correlation function among RS $s_1$ and RS $s_2$, where $N_s$ is the length of each RS. Note that if the set $\mathcal{P}_i$ contains a sufficient number of orthogonal RSs, the minimum achievable local performance metric is zero for all access nodes. One example of a choice for $s(p_i)$ is the Zadoff-Chu sequences given by:

$$s_n(p_i) = \begin{cases} e^{\frac{i\pi}{N_s} \alpha_i (n+1-\beta_i)(n-\beta_i)} & N_s \text{ odd} \\ e^{\frac{i\pi}{N_s} \alpha_i (n-\beta_i)^2} & N_s \text{ even} \end{cases}$$

where $p_i = [\alpha_i, \beta_i]^T$ and $s(p_i) = [s_0(p_i), s_1(p_i), \ldots, s_{N_s-1}(p_i)]^T$. The parameter $\alpha_i$ generates the $\alpha_i$-th root sequence, whereas $\beta_i$ generates cyclically shifted versions of such a $\alpha_i$-th root sequence. This kind of sequence exhibits the property that cyclical versions of itself (i.e., $\beta_i \neq 0$) are orthogonal to one another. To maximize the number of possible sequences with low cross-correlation among each other (i.e., $\alpha_i \neq \alpha_j$), $N_s$ may be chosen as a prime number, e.g., those slightly less than an integral power of 2, such as 31.

As a third example, each local parameter $p_i$ may represent an index to power levels out of a set $\mathcal{P}_i$ of all possible power levels for communication node i. The goal here is to find the best combinations of power levels for all communication nodes 12 (e.g., access nodes) so that the negative sum data throughput is minimized (or equivalently, the sum data throughput is maximized). In this case the local performance metric may be chosen as:

$$M_i(p_{\mathcal{A}_i}) = \log_2\left(1 + \frac{p_i}{\sum_{j \in N_i} p_j + \sigma_i^2}\right),$$

where $\sigma_i^2$ denotes the noise variance observed by the UE served by the i-th access node.

As a fourth example, the communication nodes 12 are base stations in a cellular communications network, such as the cellular communications network 10, where the base stations and/or mobile terminals served by the base stations utilize multiple antennas for transmission and precoding is utilized to provide either antenna selection or beam forming. Note that while a cellular communications network is referenced in this example, this example may also be used to provide precoder selection in other types of wireless communication systems. For antenna selection, precoding is used to select which of the multiple antennas is (are) to be utilized for transmission for each resource block of the transmitted signal. For beam selection, precoding is used to select a direction in which the transmitted signal is to be transmitted. In general, in this example, each local parameter $p_i$ represents a precoding matrix from a set of all possible precoding matrices (i.e., a precoder selection codebook) that is to be used for precoding a particular transmit resource in either a downlink signal from a base station i to a particular mobile terminal served by the base station i or an uplink signal from a particular mobile terminal served by the base station i to the base station i. For this discussion, the cellular communications network is a Long Term Evolution (LTE) cellular communications network, and the transmit resource is a resource block.

More specifically, in one embodiment of this example, each local parameter $p_i$ represents a precoding matrix for a particular resource block in a downlink signal from the base station i to a particular mobile terminal served by the base station i. In this embodiment, a value assigned to each local parameter $p_i$ is an index to a precoding matrix in a predetermined set of precoding matrices $S_i$ for the base station i. Notably, the set of precoding matrices $S_i$ may be the same for all base stations, but may alternatively vary among the base stations. The predetermined set of precoding matrices $S_i$ is a predetermined set of all possible precoding matrices for the base station i and may be defined as:

$$S_i = \left\{ \begin{bmatrix} w(1)_{1,1} & \cdots & w(1)_{1,N_{ST}} \\ \vdots & \ddots & \vdots \\ w(1)_{N_{ANT},1} & \cdots & w(1)_{N_{ANT},N_{ST}} \end{bmatrix}, \right.$$

-continued $$\left. \cdots, \begin{bmatrix} w(N_{PM})_{1,1} & \cdots & w(N_{PM})_{1,N_{ST}} \\ \vdots & \ddots & \vdots \\ w(N_{PM})_{N_{ANT},1} & \cdots & w(N_{PM})_{N_{ANT},N_{ST}} \end{bmatrix} \right\}$$

where $N_{ST}$ is a number of streams transmitted by the base station i in the downlink and is an integer greater than or equal to 1, $N_{ANT}$ is a number of antennas with which the base station i is equipped and is an integer greater than or equal to 2, and $N_{PM}$ is a number of precoding matrices in the set of precoding matrices $S_i$ and is greater than or equal to 2. In each precoding matrix, each row corresponds to a different antenna and each column corresponds to a different stream. Thus, the first precoding matrix (i.e., the precoding matrix indexed by an index of 1) is:

$$\begin{bmatrix} w(1)_{1,1} & \cdots & w(1)_{1,N_{ST}} \\ \vdots & \ddots & \vdots \\ w(1)_{N_{ANT},1} & \cdots & w(1)_{N_{ANT},N_{ST}} \end{bmatrix},$$

where $w(1)_{1,1}$ is a weight assigned to antenna 1 for stream 1 in the first precoding matrix, $w(1)_{N_{ANT},1}$ is a weight assigned to antenna $N_{ANT}$ for stream 1 in the first precoding matrix, $w(1)_{1,N_{ST}}$ is a weight assigned to antenna 1 for stream $N_{ST}$ in the first precoding matrix, and $w(1)_{N_{ANT},N_{ST}}$ is a weight assigned to antenna $N_{ANT}$ for stream $N_{ST}$ in the first precoding matrix. Similarly, the last precoding matrix (i.e., the precoding matrix indexed by an index of $N_{PM}$) is:

$$\begin{bmatrix} w(N_{PM})_{1,1} & \cdots & w(N_{PM})_{1,N_{ST}} \\ \vdots & \ddots & \vdots \\ w(N_{PM})_{N_{ANT},1} & \cdots & w(N_{PM})_{N_{ANT},N_{ST}} \end{bmatrix},$$

where $w(N_{PM})_{1,1}$ is a weight assigned to antenna 1 for stream 1 in the last precoding matrix, $w(N_{PM})_{N_{ANT},1}$ is a weight assigned to antenna $N_{ANT}$ for stream 1 in the last precoding matrix, $w(N_{PM})_{1,N_{ST}}$ is a weight assigned to antenna 1 for stream $N_{ST}$ in the last precoding matrix, and $w(N_{PM})_{N_{ANT},N_{ST}}$ is a weight assigned to antenna $N_{ANT}$ for stream $N_{ST}$ in the last precoding matrix. Notably, for antenna selection, the values of the weights w are either 0 or 1 such that the corresponding antennas are either on or off. Conversely, for beam selection, the values of the weights w are continuous, complex values. More specifically, for each precoding matrix predefined for beam selection, the weights w assigned to the antennas are complex values that result in transmission in a particular direction. For example, for a sector providing coverage over a 120 degree range, each of the precoding matrices may correspond to a different direction within that 120 degree range.

In this embodiment, the local performance metric represents the negative of data throughput of the cell corresponding to the base station i measured by:

$$M_i(p_{\mathcal{A}_i}) = $$
$$-\text{logdet}\left(I + \left(R_i + \sum_{j \in N_i} H_{ji} P(p_j) P(p_j)^H H_{ji}^H\right)^{-1} H_{ii} P(p_i) P(p_i)^H H_{ii}^H\right)$$

where I denotes an identity matrix, $R_i$ denotes the covariance matrix of the noise-plus-uncontrolled-interference experienced by the mobile terminal served by the base station i in the downlink, $H_{ji}$ denotes a Multiple-Input-Multiple-Output (MIMO) channel response from neighboring base station j to the mobile terminal served by the base station i in the downlink, $P(p_j)$ denotes the precoding matrix from a set of precoding matrices $S_j$ for the neighboring base station j specified, or indexed, by the local parameter $p_j$ for the neighboring base station j, $H_{ii}$ denotes a MIMO channel response from the base station i to the mobile terminal served by the base station i in the downlink, and $P(p_i)$ denotes the precoding matrix from the set of precoding matrices $S_i$ specified, or indexed, by the local parameter $p_i$ of the base station i.

Examples of the set of precoding matrices $S_i$ may be an LTE precoder codebook, a set of Discrete Fourier Transform (DFT) based fixed beamforming weights, and an antenna selection codebook. One example of the set of precoding matrices $S_i$ where the set of precoding matrices $S_i$ is an antenna selection codebook is given by:

$$S_i = \left\{ \begin{bmatrix} 1 & 0 \\ 0 & 1 \\ 0 & 0 \end{bmatrix} \begin{bmatrix} 1 & 0 \\ 0 & 0 \\ 0 & 1 \end{bmatrix} \begin{bmatrix} 0 & 0 \\ 1 & 0 \\ 0 & 1 \end{bmatrix} \right\}$$

where each precoding matrix in the set of precoding matrices $S_i$ is a particular precoding matrix $P(p_i)$ indexed by the local parameter $p_i$. In this particular example, each precoding matrix selects two antennas out of three. Note that the examples above are non-limiting. The details of the precoding matrices will vary depending on the particular implementation.

In this embodiment, the global performance metric $M(p)$ is simply a negative of the total downlink data throughput in the cellular communications network. Hence, in this embodiment, the graph-based distributed parameter coordination process described above with respect to, for example, FIGS. 3, 4A, 4B, 5A, 5B, 6A, and 6B is utilized by the base stations to negotiate their choices of downlink precoding matrices with their respective neighbors so that the total downlink data throughput in the cellular communications network is maximized.

In another embodiment of this fourth example, each local parameter $p_i$ represents a precoding matrix for a particular resource block in an uplink signal from a mobile terminal served by the base station i to the base station i. In this embodiment, a value assigned to each local parameter $p_i$ is an index to a precoding matrix in a predetermined set of precoding matrices $S_i$ for the mobile terminal served by the base station i. Notably, the set of precoding matrices $S_i$ may be the same for all mobile terminals served by the base station i, but may alternatively vary among the mobile terminals. Similarly, the set of precoding matrices $S_i$ may be the same for all mobile terminals served by all of the base stations, but may alternatively vary among the mobile terminals served by different base stations. The predetermined set of precoding matrices $S_i$ is a predetermined set of all possible precoding matrices for the uplink to the base station i (i.e., a predetermined set of all possible precoding matrices for precoding at the mobile terminal for the uplink to the base station i) and may be defined as:

$$S_i = \left\{ \begin{bmatrix} w(1)_{1,1} & \cdots & w(1)_{1,N_{ST}} \\ \vdots & \ddots & \vdots \\ w(1)_{N_{ANT},1} & \cdots & w(1)_{N_{ANT},N_{ST}} \end{bmatrix}, \right.$$

$$\left. \cdots, \begin{bmatrix} w(N_{PM})_{1,1} & \cdots & w(N_{PM})_{1,N_{ST}} \\ \vdots & \ddots & \vdots \\ w(N_{PM})_{N_{ANT},1} & \cdots & w(N_{PM})_{N_{ANT},N_{ST}} \end{bmatrix} \right\}$$

where for the uplink $N_{ST}$ is a number of streams transmitted by the mobile terminal in the uplink to the base station i and is an integer greater than or equal to 1, $N_{ANT}$ is a number of antennas with which the mobile terminal served by the base station i is equipped which is an integer greater than or equal to 2, and $N_{PM}$ is a number of precoding matrices in the set of precoding matrices $S_i$ and is greater than or equal to 2. As discussed above, in each precoding matrix, each row corresponds to a different antenna and each column corresponds to a different stream. Examples of the set of precoding matrices $S_i$ may be an LTE precoder codebook, a set of DFT-based fixed beamforming weights, and an antenna selection codebook.

In this embodiment, the local performance metric represents the negative of data throughput of the cell corresponding to the base station i measured by:

$$M_i(p_{\mathcal{A}_i}) = -\text{logdet}\left(I + \left(R_i + \sum_{j \in N_i} H_{ji} P(p_j) P(p_j)^H H_{ji}^H\right)^{-1} H_{ii} P(p_i) P(p_i)^H H_{ii}^H\right)$$

where, for the uplink embodiment, I denotes an identity matrix, $R_i$ denotes the covariance matrix of the noise-plus-uncontrolled-interference experienced by the base station i in the uplink from the mobile terminal, $H_{ji}$ denotes a MIMO channel response from a mobile terminal served by the neighboring base station j scheduled to use the same resource block to the base station i in the uplink, $P(p_j)$ denotes the precoding matrix from a set of precoding matrices $S_j$ for the mobile terminal served by the neighboring base station j specified, or indexed, by the local parameter $p_j$ for the neighboring base station j, $H_{ii}$ denotes a MIMO channel response from mobile terminal served by the base station i to the base station i in the uplink, and $P(p_i)$ denotes the precoding matrix from the set of precoding matrices $S_i$ specified, or indexed, by the local parameter $p_i$ of the base station i.

In this embodiment, the global performance metric $M(p)$ is simply a negative of the total uplink data throughput in the cellular communications network. Hence, in this embodiment, the graph-based distributed parameter coordination process described above with respect to, for example, FIGS. 4A, 4B, 5A, 5B, 6A, and 6B is utilized by the base stations to negotiate their choices of downlink precoding matrices with their respective neighbors so that the total uplink data throughput in the cellular communications network is maximized.

It should be noted that the processes of FIGS. 3 through 6 are scalable to arbitrarily large networks since their computational complexity and communication overhead increase only with the maximum number of neighboring communication nodes instead of the total number of communication nodes 12 in the cellular communications network 10. Thus, the processes of FIGS. 3 through 6 are general, scalable processes for coordinating local parameters throughout the cellular communications network 10 in a distributed manner and have a wide range of potential applications in wireless communications including device-to-device communications and self-organizing networks.

FIG. 7 is a block diagram of one of the communication nodes 12 according to one embodiment of the present disclosure. This discussion is equally applicable to all of the communication nodes 12. The communication node 12 includes one or more transceiver subsystems 14 and a processing subsystem 16. At least one of the transceiver subsystems 14 generally includes analog and, in some embodiments, digital components for sending and receiving messages (e.g., summary and aggregate messages) to and from the other communication nodes 12. In particular embodiments, the transceiver subsystems 14 may represent or include Radio Frequency (RF) transceivers, or separate RF transmitters and receivers, capable of transmitting such messages and/or other suitable information wirelessly to other components.

The processing subsystem 16 generally operates to receive and send messages via the one or more transceiver subsystems 14 and to generate and process messages as described herein. Specifically, the processing subsystem 16 operates to compute summary messages and aggregate messages as described herein.

In particular embodiments, the processing subsystem 16 may comprise, for example, one or several general-purpose or special-purpose microprocessors or other microcontrollers programmed with suitable software and/or firmware to carry out some or all of the functionality of the communication node 12 described herein. In addition or alternatively, the processing subsystem 16 may comprise various digital hardware blocks (e.g., one or more Application Specific Integrated Circuits (ASICs), one or more off-the-shelf digital and analog hardware components, or a combination thereof) configured to carry out some or all of the functionality of the communication node 12 described herein. Additionally, in particular embodiments, the above described functionality of the communication node 12 may be implemented, in whole or in part, by the processing subsystem 16 executing software or other instructions stored on a non-transitory computer-readable medium, such as Random Access Memory (RAM), Read Only Memory (ROM), a magnetic storage device, an optical storage device, or any other suitable type of data storage components.

The following acronyms are used throughout this disclosure.
ASIC Application Specific Integrated Circuit
DFT Discrete Fourier Transform
eNodeB Enhanced Node B
GSM Global System for Mobile Communications
LTE Long Term Evolution
MIMO Multiple-Input-Multiple-Output
RAM Random Access Memory
RF Radio Frequency
ROM Read Only Memory
RS Reference Signal
SISO Single-Input-Single-Output
UE User Equipment Those skilled in the art will recognize improvements and modifications to the preferred embodiments of the present disclosure. All such improvements and modifications are considered within the scope of the concepts disclosed herein and the claims that follow.

What is claimed is:

1. A method of operation of a communication node in a communications network, comprising:
    iteratively exchanging reduced size messages with a plurality of neighboring communication nodes in the communications network based on a factor graph until one or more predefined stopping criteria are satisfied, the factor graph modeling discrete local parameters to be coordinated among communication nodes in the communications network and corresponding local performance metrics of the communication nodes, wherein iteratively exchanging the reduced size messages with the plurality of neighboring communication nodes comprises:
        generating summary messages for the plurality of neighboring communication nodes according to a min-sum algorithm where each summary message of the summary messages comprises a number of values;
        generating reduced size summary messages for the plurality of neighboring communication nodes from the summary messages for the plurality of neighboring communication nodes such that each reduced size summary message of the reduced size summary messages comprises the K smallest values from a corresponding one of the summary messages for the plurality of neighboring communication nodes, where K is less than a number of values in the corresponding one of the summary messages for the plurality of neighboring communication nodes; and
        sending each reduced size summary message of the reduced size summary messages to a corresponding one of the plurality of neighboring communication nodes; and
    computing an optimal value for the local parameter of the communication node based on results of iteratively exchanging the reduced size messages with the plurality of neighboring communication nodes.

2. The method of claim 1 wherein computing the optimal value for the local parameter of the communication node comprises computing the optimal value for the local parameter of the communication node such that the optimal value for the local parameter and corresponding optimal values determined for local parameters of other communication nodes in the communications network together optimize a global performance metric for the communications network.

3. The method of claim 2 wherein iteratively exchanging the reduced size messages with the plurality of neighboring communication nodes comprises iteratively exchanging the reduced size messages with the plurality of neighboring communication nodes according to a min-sum algorithm that minimizes the global performance metric for the communications network.

4. The method of claim 2 wherein iteratively exchanging the reduced size messages with the plurality of neighboring communication nodes comprises iteratively exchanging reduced size summary messages and reduced size aggregate messages according to a min-sum algorithm that minimizes the global performance metric for the communications network.

5. The method of claim 4 wherein iteratively exchanging reduced size summary messages and reduced size aggregate messages according to a min-sum algorithm comprises:
    sending summary messages to ones of the plurality of neighboring communication nodes having corresponding local parameters represented as variable nodes in the factor graph that are connected to a factor node in the factor graph that represents a local metric of the communication node; and receiving aggregate messages from the ones of the plurality of neighboring communication nodes having corresponding local parameters represented as variable nodes in the factor graph that are connected to the factor node in the factor graph that represents the local metric of the communication node.

6. The method of claim 1 wherein generating the reduced size summary messages comprises generating the reduced size summary messages such that each reduced size summary message of the reduced size summary messages comprises only one of a plurality of values from a corresponding one of the summary messages for the plurality of neighboring communication nodes.

7. The method of claim 6 wherein the one of the plurality of values from the corresponding one of the summary messages is a minimum value of the plurality of values from the corresponding one of the summary messages.

8. The method of claim 1 wherein iteratively exchanging reduced size messages further comprises:
receiving reduced size summary messages from the plurality of neighboring communication nodes;
generating full size summary messages from the reduced size summary messages received from the plurality of neighboring communication nodes;
generating aggregate messages for the plurality of neighboring communication nodes according to the min-sum algorithm based on the full size summary messages generated from the reduced size summary messages received from the plurality of neighboring communication nodes;
generating reduced size aggregate messages for the plurality of neighboring communication nodes from the aggregate messages for the plurality of neighboring communication nodes; and
sending each reduced size aggregate message of the reduced size aggregate messages to a corresponding one of the plurality of neighboring communication nodes.

9. The method of claim 8 wherein each reduced size summary message of the reduced size summary messages received from the plurality of neighboring communication nodes comprises one or more values from a corresponding summary message computed by a corresponding one of the plurality of neighboring communication nodes according to the min-sum algorithm and, for each value of the one or more values, an index of the value in the corresponding summary message; and
generating the full size summary messages comprises, for each full size summary message of the full size summary messages, generating the full size summary message from a corresponding one of the reduced size summary messages received from the plurality of neighboring communication nodes such that:
each value of the one or more values from the corresponding one of the reduced size summary messages is inserted into a location within the full size summary message corresponding to the index of the value in the corresponding one of the reduced size summary messages; and
remaining locations within the full size summary message are filled with one or more predefined values.

10. The method of claim 8 wherein generating the reduced size aggregate messages comprises generating the reduced size aggregate messages such that each reduced size aggregate message of the reduced size aggregate messages comprises one or more values but less than all values from a corresponding one of the aggregate messages for the plurality of neighboring communication nodes.

11. The method of claim 8 wherein generating the reduced size aggregate messages comprises generating the reduced size aggregate messages such that each reduced size aggregate message of the reduced size aggregate messages comprises K smallest values from a corresponding one of the aggregate messages for the plurality of neighboring communication nodes, where K is less than a number of values in the corresponding one of the aggregate messages for the plurality of neighboring communication nodes.

12. The method of claim 8 wherein generating the reduced size aggregate messages comprises generating the reduced size aggregate messages such that each reduced size aggregate message of the reduced size aggregate messages comprises only one of a plurality of values from a corresponding one of the aggregate messages for the plurality of neighboring communication nodes.

13. The method of claim 12 wherein the one of the plurality of values from the corresponding one of the aggregate messages is a minimum value of the plurality of values from the corresponding one of the aggregate messages.

14. The method of claim 1 wherein iteratively exchanging reduced size messages further comprises:
receiving reduced size summary messages from the plurality of neighboring communication nodes;
generating full size summary messages from the reduced size summary messages received from the plurality of neighboring communication nodes;
determining whether one or more stopping criteria have been satisfied; and
if the one or more stopping criteria having not been satisfied:
generating aggregate messages for the plurality of neighboring communication nodes according to the min-sum algorithm based on the full size summary messages generated from the reduced size summary messages received from the plurality of neighboring communication nodes;
generating reduced size aggregate messages for the plurality of neighboring communication nodes from the aggregate messages for the plurality of neighboring communication nodes; and
sending each reduced size aggregate message of the reduced size aggregate messages to a corresponding one of the plurality of neighboring communication nodes.

15. The method of claim 14 wherein each reduced size summary message of the reduced size summary messages received from the plurality of neighboring communication nodes comprises one or more values from a corresponding summary message computed by a corresponding one of the plurality of neighboring communication nodes according to the min-sum algorithm and, for each value of the one or more values, an index of the value in the corresponding summary message; and
generating the full size summary messages comprises, for each full size summary message of the full size summary messages, generating the full size summary message from a corresponding one of the reduced size summary messages received from the plurality of neighboring communication nodes such that:
each value of the one or more values from the corresponding one of the reduced size summary messages is inserted into a location within the full size summary message corresponding to the index of the value included in the corresponding one of the reduced size summary messages; and remaining locations within the full size summary message are filled with one or more predefined values.

16. The method of claim 14 wherein generating the reduced size aggregate messages comprises generating the reduced size aggregate messages such that each reduced size aggregate message of the reduced size aggregate messages comprises one or more values but less than all values from a corresponding one of the aggregate messages for the plurality of neighboring communication nodes.

17. The method of claim 14 wherein generating the reduced size aggregate messages comprises generating the reduced size aggregate messages such that each reduced size aggregate message of the reduced size aggregate messages comprises K smallest values from a corresponding one of the aggregate messages for the plurality of neighboring communication nodes, where K is less than a number of values in the corresponding one of the aggregate messages for the plurality of neighboring communication nodes.

18. The method of claim 14 wherein generating the reduced size aggregate messages comprises generating the reduced size aggregate messages such that each reduced size aggregate message of the reduced size aggregate messages comprises only one of a plurality of values from a corresponding one of the aggregate messages for the plurality of neighboring communication nodes.

19. The method of claim 18 wherein the one of the plurality of values from the corresponding one of the aggregate messages is a minimum value of the plurality of values from the corresponding one of the aggregate messages.

20. The method of claim 1 wherein iteratively exchanging the reduced size messages with the plurality of neighboring communication nodes comprises:
generating aggregate messages for the plurality of neighboring communication nodes according to a min-sum algorithm;
generating reduced size aggregate messages for the plurality of neighboring communication nodes from the aggregate messages for the plurality of neighboring communication nodes; and
sending each reduced size aggregate message of the reduced size aggregate messages to a corresponding one of the plurality of neighboring communication nodes.

21. The method of claim 20 wherein generating the reduced size aggregate messages comprises generating the reduced size aggregate messages such that each reduced size aggregate message of the reduced size aggregate messages comprises one or more values but less than all values from a corresponding one of the aggregate messages for the plurality of neighboring communication nodes.

22. The method of claim 20 wherein generating the reduced size aggregate messages comprises generating the reduced size aggregate messages such that each reduced size aggregate message of the reduced size aggregate messages comprises K smallest values from a corresponding one of the aggregate messages for the plurality of neighboring communication nodes, where K is less than a number of values in the corresponding one of the aggregate messages for the plurality of neighboring communication nodes.

23. The method of claim 20 wherein generating the reduced size aggregate messages comprises generating the reduced size aggregate messages such that each reduced size aggregate message of the reduced size aggregate messages comprises only one of a plurality of values from a corresponding one of the aggregate messages for the plurality of neighboring communication nodes.

24. The method of claim 23 wherein the one of the plurality of values from the corresponding one of the aggregate messages is a minimum value of the plurality of values from the corresponding one of the aggregate messages.

25. The method of claim 20 wherein iteratively exchanging reduced size messages further comprises:
receiving reduced size aggregate messages from the plurality of neighboring communication nodes;
generating full size aggregate messages from the reduced size aggregate messages received from the plurality of neighboring communication nodes;
generating summary messages for the plurality of neighboring communication nodes according to the min-sum algorithm based on the full size aggregate messages generated from the reduced size aggregate messages received from the plurality of neighboring communication nodes;
generating reduced size summary messages for the plurality of neighboring communication nodes from the summary messages for the plurality of neighboring communication nodes; and
sending each reduced size summary message of the reduced size summary messages to a corresponding one of the plurality of neighboring communication nodes.

26. The method of claim 25 wherein each reduced size aggregate message of the reduced size aggregate messages received from the plurality of neighboring communication nodes comprises one or more values from a corresponding aggregate message computed by a corresponding one of the plurality of neighboring communication nodes according to the min-sum algorithm and, for each value of the one or more values, an index of the value in the corresponding aggregate message; and
generating the full size aggregate messages comprises, for each full size aggregate message of the full size aggregate messages, generating the full size aggregate message from a corresponding one of the reduced size aggregate messages received from the plurality of neighboring communication nodes such that:
each value of the one or more values from the corresponding one of the reduced size aggregate messages is inserted into a location within the full size aggregate message corresponding to the index of the value included in the corresponding one of the reduced size aggregate messages; and
remaining locations within the full size aggregate message are filled with one or more predefined values.

27. The method of claim 25 wherein generating the reduced size summary messages comprises generating the reduced size summary messages such that each reduced size summary message of the reduced size summary messages comprises one or more values but less than all values from a corresponding one of the summary messages for the plurality of neighboring communication nodes.

28. The method of claim 25 wherein generating the reduced size summary messages comprises generating the reduced size summary messages such that each reduced size summary message of the reduced size summary messages comprises K smallest values from a corresponding one of the summary messages for the plurality of neighboring communication nodes, where K is less than a number of values in the corresponding one of the summary messages for the plurality of neighboring communication nodes.

29. The method of claim 25 wherein generating the reduced size summary messages comprises generating the reduced size summary messages such that each reduced size summary message of the reduced size summary messages comprises only one of a plurality of values from a corresponding one of the summary messages for the plurality of neighboring communication nodes.

30. The method of claim 29 wherein the one of the plurality of values from the corresponding one of the summary messages is a minimum value of the plurality of values from the corresponding one of the summary messages.

31. The method of claim 1 wherein the communications network is a wireless communications network.

32. The method of claim 1 wherein the communications network is a wireless communications network, the communication node is a base station in the wireless communications network, and the plurality of neighboring communication nodes is a plurality of neighboring base stations.

33. A communication node comprising:
a transceiver subsystem; and
a processing subsystem associated with the transceiver subsystem configured to:
iteratively exchange reduced size messages with a plurality of neighboring communication nodes in a communications network based on a factor graph until one or more predefined stopping criteria are satisfied, the factor graph modeling discrete local parameters to be coordinated among communication nodes in the communications network and corresponding local performance metrics of the communication nodes, by:
generating summary messages for the plurality of neighboring communication nodes according to a min-sum algorithm where each summary message of the summary messages comprises a number of values;
generating reduced size summary messages for the plurality of neighboring communication nodes from the summary messages for the plurality of neighboring communication nodes such that each reduced size summary message of the reduced size summary messages comprises the K smallest values from a corresponding one of the summary messages for the plurality of neighboring communication nodes, where K is less than a number of values in the corresponding one of the summary messages for the plurality of neighboring communication nodes; and
sending each reduced size summary message of the reduced size summary messages to a corresponding one of the plurality of neighboring communication nodes; and
compute an optimal value for the local parameter of the communication node based on results of iteratively exchanging the reduced size messages with the plurality of neighboring communication nodes.

* * * * *